(12) United States Patent
Vazhenin et al.

(10) Patent No.: US 10,274,580 B2
(45) Date of Patent: Apr. 30, 2019

(54) POSITION DETERMINATION OF A MOBILE STATION USING MODIFIED WI-FI SIGNALS

(71) Applicant: TOPCON POSITIONING SYSTEMS, INC., Livermore, CA (US)

(72) Inventors: Nikolay Afanasyevich Vazhenin, Moscow (RU); Andrey Vladimirovich Veitsel, Moscow (RU); Vladimir Viktorovich Veitsel, Moscow (RU); Fedor Borisovich Serkin, Moscow (RU)

(73) Assignee: TOPCON POSITIONING SYSTEMS, INC., Livermore, CA (US)

( * ) Notice: Subject to any disclaimer, the term of this patent is extended or adjusted under 35 U.S.C. 154(b) by 0 days.

(21) Appl. No.: 15/752,279

(22) PCT Filed: May 24, 2016

(86) PCT No.: PCT/RU2016/000311
§ 371 (c)(1),
(2) Date: Feb. 13, 2018

(87) PCT Pub. No.: WO2017/204673
PCT Pub. Date: Nov. 30, 2017

(65) Prior Publication Data
US 2019/0025401 A1    Jan. 24, 2019

(51) Int. Cl.
| | |
|---|---|
| *H04W 24/00* | (2009.01) |
| *G01S 5/08* | (2006.01) |
| *G01S 3/46* | (2006.01) |
| *H04W 64/00* | (2009.01) |
| *H04W 4/029* | (2018.01) |

(Continued)

(52) U.S. Cl.
CPC .... *G01S 5/08* (2013.01); *G01S 3/46* (2013.01); *H04L 27/2082* (2013.01); *H04W 4/029* (2018.02); *H04W 56/001* (2013.01); *H04W 64/003* (2013.01); *H04W 84/12* (2013.01); *H04W 84/20* (2013.01)

(58) Field of Classification Search
CPC .......... G01S 5/08; G01S 3/46; H04W 56/001; H04W 64/003; H04W 4/029; H04W 84/20; H04W 84/12; H04L 27/2082
USPC ............................. 455/456.1–456.3; 370/338
See application file for complete search history.

(56) References Cited

U.S. PATENT DOCUMENTS

2016/0277898 A1*  9/2016  Bengtsson ............ H04W 4/029

FOREIGN PATENT DOCUMENTS

| WO | 2000036767 A1 | 6/2000 |
|---|---|---|
| WO | 2010014969 A1 | 2/2010 |
| WO | 2011133362 A2 | 10/2011 |

OTHER PUBLICATIONS

International Search Report and Written Opinion dated Feb. 16, 2017, in connection with International Patent Application No. PCT/RU2016/000311, 6 pgs.

* cited by examiner

*Primary Examiner* — Marcos Batista
(74) *Attorney, Agent, or Firm* — Chiesa Shaninian & Giantomasi PC

(57) ABSTRACT

Position determination for a mobile station is achieved through the modification of certain Wi-Fi access point and station signals, that are radiated by a certain master (i.e., guiding) base station, combined with slave (i.e., guided) stations having known coordinates, and processing the signals received from these base stations at the mobile station to determine the desired position.

30 Claims, 24 Drawing Sheets

(51) Int. Cl.
  *H04L 27/20*  (2006.01)
  *H04W 56/00*  (2009.01)
  *H04W 84/12*  (2009.01)
  *H04W 84/20*  (2009.01)

Navigation frame of type 1 (Standard 802.11 DSSS
(HR/DSSS PPDU - short preamble)

Navigation frame of type 2 (Modified 802.11 DSSS
(HR/DSSS PPDU - short preamble)

Navigation frame of type 3

Standard SYNC field generation method

Modified SYNC or PNS fields generation method

PNS field generation

POSITION DETERMINATION OF A MOBILE STATION USING MODIFIED WI-FI SIGNALS

CROSS-REFERENCE TO RELATED APPLICATIONS

This application is a national stage (under 35 U.S.C. 371) of International Patent Application No. PCT/RU2016/000311, filed May 24, 2016, which is herein incorporated by reference in its entirety.

TECHNICAL FIELD

The present invention relates generally to radio navigation systems and, more particularly, to determining the current coordinates and motion parameters of movable objects when, for example, Global Navigation Satellite System (GNSS) signal reception is impossible or deficient in providing a desired positioning accuracy.

BACKGROUND

The ability to determine current coordinates and motion parameters of movable objects (e.g., moving vehicles) using radio navigation systems is a long-standing problem and there are many well-known solutions representing a variety of techniques for such determination.

In one case, this determination can be accomplished using so-called range-difference location methods which are often used, for example, in different navigation satellite systems, such as the US Global Positioning System (GPS), the Russian GLONASS or European GALILEO, as are well-known. However, indoor GNSS signal reception, for example, within locations having deep mines, canyons or other such impenetrable formations, and/or dense urban high-rise housing developments is limited due to the restricted line-of-sight visibility of satellites in such navigation systems which results in a sharp drop in the effectiveness of such systems with respect to position determination.

Of course, to combat some of these challenges, there are well-known techniques to determine positions of vehicles that use pseudolite signals (i.e., pseudo-satellite signals) to achieve a certain level of navigation accuracy. For example, U.S. Pat. Nos. 6,449,558, 7,495,614, 7,859,462, and 8,675, 561 describe different techniques for using pseudolite signals. Alternatively, there are also a number of well-known techniques (for example, as described in U.S. Pat. Nos. 8,738,035, and 6,449,558) that employ so-called hybrid positioning devices which utilize both GNSS signals and other different signals supplied by ground base stations to achieve position determination. An advantage of such systems is better coverage of the desired territory and improved position accuracy. However, such systems are, as a general matter, very complicated and expensive to deploy, and function as position-determining rather than data-transmitting thereby leading to low communication channel throughput. Further, these potential limitations are compounded in that the task of developing positioning-determining and data-transmitting systems for movable objects is quite critical in delivering certain desired levels of position determination and data communication.

To overcome some of the aforementioned limitations, there are a number of well-known positioning techniques that use Wi-Fi access points (hereinafter "AP") and are based on measuring the strength of the received signal with a further comparison of the measured strength and the known spatial power distribution (e.g., the so-called fingerprinting positioning method). Such a fingerprinting position methodology is described, for example, in U.S. Pat. Nos. 7,515,578, 8,155,673, and 8,838,151. These technical solutions can be used for both position-determination and data transmission/reception of movable subscribers/customers via a Wi-Fi network. Some alternative well-known technical solutions also providing data transmission along with positioning tasks are also described, for example, in Unites States Patent Publication Nos. 2015/0087331, 2015/0099536, and 2015/0172863, respectively, wherein signals are transmitted through information channels of Wi-Fi networks. However, these known methods do not allow for obtaining highly accurate coordinate estimates (i.e., as measured in centimeter increments) and include a number of technical implementation difficulties that make deployment challenging.

Other known technical solutions for position determination (e.g., as described in U.S. Pat. Nos. 7,515,578, 7,916, 661, and 8,155,673) employ certain information from ground maps, Wi-Fi AP distribution, and/or coverage zones and received signal intensity to specify a mobile user's position. Further, certain other known positioning devices (e.g., as described in United States Patent Publication Nos. 2012/0075145 and 2013/0093619) employ the phase difference of signals being received by selected spaced antennas to determine the position of a movable object.

U.S. Pat. No. 7,859,462 is another known positioning technique in which a rover's position is determined using a number of reference transmitters which generate and transmit in-phase navigation signals, which are received by a rover, and determining the delays associated with the received signals for the purpose of calculating the rover's position. However, this technique cannot be directly used for transmitting information between reference transmitters and a mobile receiver/rover due to low communication channel throughput.

Therefore, a need exists for an improved technique for determining the current coordinates and motion parameters of movable objects including when GNSS signal reception is impossible or deficient in providing a desired positioning accuracy.

BRIEF SUMMARY OF THE EMBODIMENTS

In accordance with the embodiments herein, a position determination is achieved through the modification of certain Wi-Fi access point and station signals, that are radiated by a certain master (i.e., guiding) base station, combined with slave (i.e., guided) stations having known coordinates, and processing the signals received from these base stations at a mobile station (or user) to calculate the desired position.

In particular, in accordance with various embodiments, a method and apparatus is provided for determining a mobile station's (e.g., a rover) position by utilizing modified Wi-Fi signals (e.g. in accordance with well-known IEEE 802.11 protocol) and transmitting and receiving Wi-Fi signals by a plurality of base stations, receiving signals transmitted by these base stations (which have known coordinates) and located in some proximity to the mobile station, measuring delay phase differences being received from different pairs of the base stations at the mobile station, and calculating position coordinates of the mobile station (also referred to herein as a mobile object) using the delay and phase differences. The aforementioned position coordinate calculation facilitated by transmitting and receiving of the Wi-Fi signals that are produced by a guiding (i.e., master) base station and a guided (i.e., slave) station(s) which are spatially located in a predetermined manner, and the master base station and slave stations periodically transmit signals in the form of frames with an assigned structure according to a predetermined time sequence, such that the structure of transmitted frames contains a specially generated symbol sequence which is used for the positioning of the moving object, and transmitting service information needed for positioning tasks is implemented in fields of a preamble header and in select/available information fields of such frame.

In an embodiment, the positioning of a mobile user (e.g., a rover-station) by modified Wi-Fi signals (e.g., the IEEE 802.11 protocol) is facilitated by radiating and receiving the Wi-Fi signals by a guiding base station (master station) and guided base stations (slave stations) previously located in space, periodically radiating signals in the form of a pre-set frame, according to a pre-set time sequence, by the master and slave stations. This includes a specially-generated symbol sequence in the structure of radiated frames, in which the sequence is used for positioning mobile users. Further, there is a transmission of service information needed for solving positioning tasks in the header field of the frame preamble and free/available frame information fields.

In accordance with an embodiment, a preamble fragment with a scrambled set of units of the pre-set length expanded by the Barker code is used as a symbol sequence. In accordance with an embodiment, in addition to a preamble fragment with a scrambled set of units of the pre-set length expanded by the Barker code, some other pseudo-random sequences (PRS) situated/located at available frame fields are utilized, excluding fields whose content cannot be previously assigned or determined. Further, the PRS chip duration, agreed upon using Wi-Fi signal parameters, is used as a symbol sequence for positioning tasks.

In accordance an embodiment, a preamble fragment with a scrambled set of units of a preset length is used as a symbol sequence to determine a position of the movable object. In accordance with an embodiment of one or more pseudo-random sequences (PRS) are used in addition to the scrambled set of units of a preset length. These sequences are located at available frame fields excluding fields where the content cannot be previously set or determined.

In a further embodiment, operated according to the well-known IEEE protocol 802.11b, the master base station generates a QPSK-modulated signal for the entire frame being transmitted, and one of quadrature components of the transmitted signal (for example, designated as "I"), is used to transfer information in a standard mode. Another quadrature component of the transmitted signal (for example, designated as Q) is used to transmit a navigation signal as a PRS, the total duration of which can achieve the frame duration, and PRS symbols in the Q-channel are additionally modulated by the shifted Barker code the length of which coincides with the length of the similar code in the I-channel. In reception of such a signal at a mobile station different reference PRS and shifted Barker codes are applied to quadrature channels of the phase synchronization system.

A further embodiment has the clock and frequency synchronization for the master and slave base stations implemented by a separate communications link, for example, a cable network.

A further embodiment utilizes clock and frequency synchronization of the master and slave base stations with radio signals radiated by the master base station, such that the navigation signal transmitted by the master station is used as the synchronization signal.

In accordance with an embodiment, a standard request to send/clear to send (RTS/CTS) handshake («RTX/CTS handshake») mechanism is used (in accordance with the 802.11 protocol) to implement time division of base navigation signals, a time interval is allocated to the master station to radiate a broadband message (a Beacon type frame) that is immediately followed by a navigation frame. Further, having received frames from the master station, the slave stations compute time intervals for radiating their signals and at a particular time they initiate the standard «RTS/CTS handshake» mechanism from the master station which provides for the radiating navigation frames from the slave stations. Mobile stations can also initiate data transfer at an allocated time interval by the same mechanism with the described frame exchange implemented periodically in accordance with signals generated by the master base station.

In accordance with an embodiment, interframe intervals are removed to enhance efficiency, and master and slave stations sequentially radiate navigation frames at preset time intervals. A mobile station (e.g., rover) transmits information within an allocated time interval where the aforementioned frame exchange is periodically implemented in accordance with signals generated by the master base station.

In accordance with an embodiment, one of the operation modes of the 802.11 protocol is used by the master base station which can assign time intervals (Contention-Free Period (CFP)), wherein signals can be transmitted by different devices only when such device is enabled by the master station. The time intervals are divided into two parts, namely, a navigation part and communication part. The navigation part is used for radiating navigation frames at pre-set time intervals by the master and slave station, and the communication part is used for sequential requests of data from rovers by the master base station. In reply, each rover transmits a data frame, and once each frame has been received, the master station generates and transmits a corresponding frame such that the described frame exchange is periodically implemented under the control of the master base station.

These and other advantages of the embodiments will be apparent to those of ordinary skill in the art by reference to the following detailed description and the accompanying drawings.

DETAILED DESCRIPTION

In accordance with the embodiments herein, a position determination is achieved through the modification of certain Wi-Fi access point and station signals, that are radiated by a certain master (i.e., guiding) base station, combined with slave (i.e., guided) stations having known coordinates, and processing the signals received from these base stations at a mobile station (or user) to calculate the desired position.

This will be further described in greater detail herein below and the discussion (and associated Figures) will employ the following set of acronyms and abbreviations in Table 1:

TABLE 1

Acronyms and Abbreviations

| | |
|---|---|
| ACK | Acknowledgment |
| CCA | Clear Channel Assessment |
| CFP | Contention-Free Period |
| CRC | Cyclic Redundancy Code |
| CTS | Clear To Send |
| DSSS | Direct Sequence Spread Spectrum |
| HR/DSSS | High Rate DSSS |
| MAC | Medium Access Control |
| MAP | Master Access Point |
| MSTA | Master Station |
| MPDU | MAC Protocol Data Unit |
| PHY | Physical layer |
| PLCP | Physical Layer Convergence Procedure |
| PNS | Pseudo Noise Sequence |
| POLL | Poll frame |
| PPDU | PLCP Protocol Data Unit |
| RSTA | Rover (mobile) STA |
| RTS | Request To Send |
| SFD | Start Frame Delimiter |
| SSTA | Slave (fixed STA) |
| STA | Station |
| SYNC | Synchronization field |
| USTA | User STA |
| WLAN | Wireless Local Area Network |
| ZB | "Zero" Bits |

In particular, in accordance with various embodiments, a method and apparatus is provided for determining a mobile station's (e.g., a rover) position by utilizing modified Wi-Fi signals (e.g. in accordance with well-known IEEE 802.11 protocol) and transmitting and receiving Wi-Fi signals by a plurality of base stations, receiving signals transmitted by these base stations (which have known coordinates) and located in some proximity to the mobile station, measuring delay phase differences being received from different pairs of the base stations at the mobile station, and calculating position coordinates of the mobile station (also referred to herein as a mobile object) using the delay and phase differences. The aforementioned position coordinate calculation facilitated by transmitting and receiving of the Wi-Fi signals that are produced by a guiding (i.e., master) base station and a guided (i.e., slave) station(s) which are spatially located in a predetermined manner, and the master base station and slave stations periodically transmit signals in the form of frames with an assigned structure according to a predetermined time sequence, such that the structure of transmitted frames contains a specially generated symbol sequence which is used for the positioning of the moving object, and transmitting service information needed for positioning tasks is implemented in fields of a preamble header and in select/available information fields of such frame.

Figure 1:
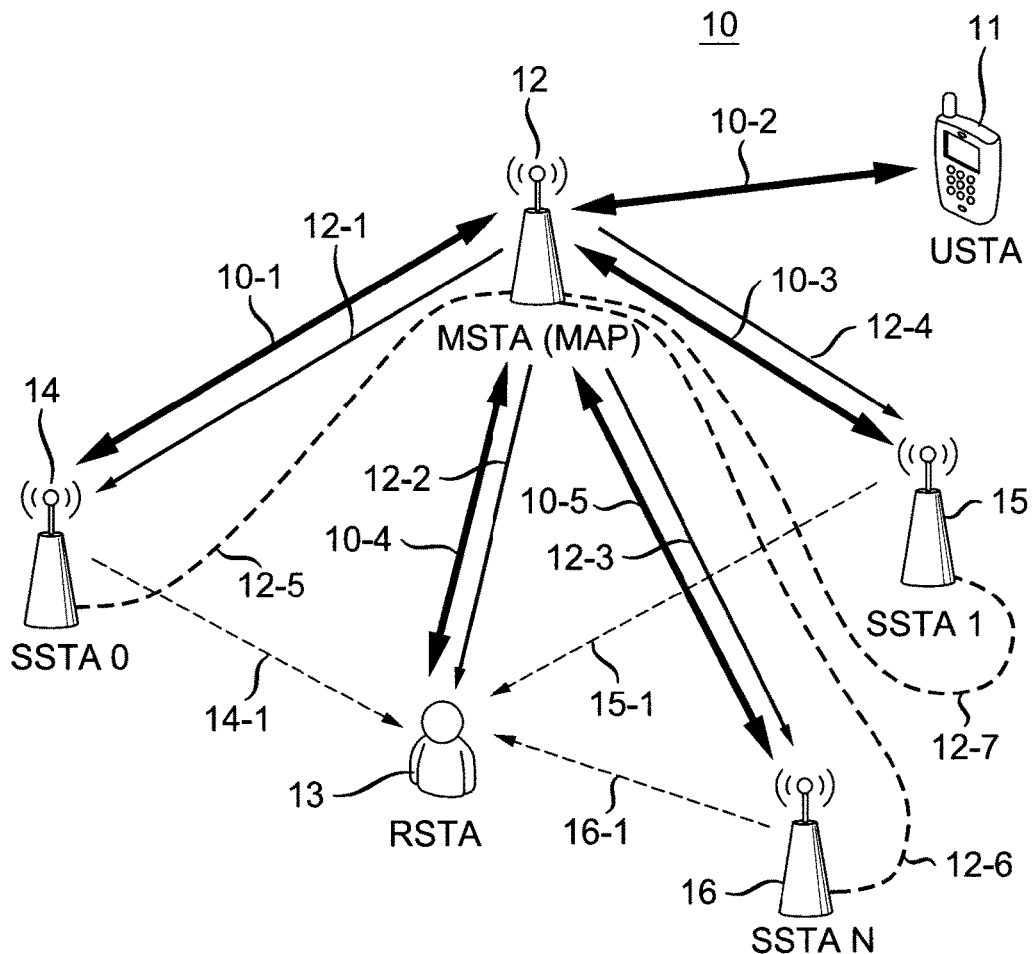
FIG. 1 is a diagram illustrating a mobile station's position determination when the clock and frequency scales of the master and slave base stations are synchronized using a separate communications link to transmit synchronized signals in accordance with an embodiment.

FIG. 1 shows diagram 10 illustrating a mobile station's position determination when clock and frequency scales of the master and slave base stations are synchronized using a separate communications link to transmit synchronized signals in accordance with an embodiment. In particular, master station 12 and a set of slave stations 14, 15, 16 will be utilized to determine the current position of mobile station(s) 13 (e.g. rover(s)). In accordance with the embodiment, such position determination will be based on signals exchanged between master station 12, slave stations 14, 15, 16, user station 11, and the use of modified Wi-Fi signals (illustratively, Wi-Fi signals in accordance the well-known IEEE 802.11 protocol).

Illustratively, information (i.e., antenna) ports of exchanging data from master station 12, as further described herein below, that use modified Wi-Fi signals through a transmission/access medium are connected with corresponding information (antenna) ports of user station 11, slave stations 14, 15, 16, and mobile station(s) 13 and provide data exchange between these objects in accordance with Wi-Fi protocol. As will be appreciated, while only one rover and one user station are shown in FIG. 1 for illustration purposes, the principles of the embodiment apply to multiple mobile stations and multiple user stations, as well as any number of master base stations and slave base stations. Master base station 12 includes a navigation port (not shown) for generating navigation signals 12-1, 12-2, 12-3, and 12-4 which are exchanged with slave base stations 14, 15, and 16, and for exchanging communication signals 10-1, 10-2, 10-3, and 10-4 (illustratively, Wi-Fi signals) through the applicable transmission medium with rover(s) 13, user station 11, and slave base stations 14, 15, and 16.

Figure 3:
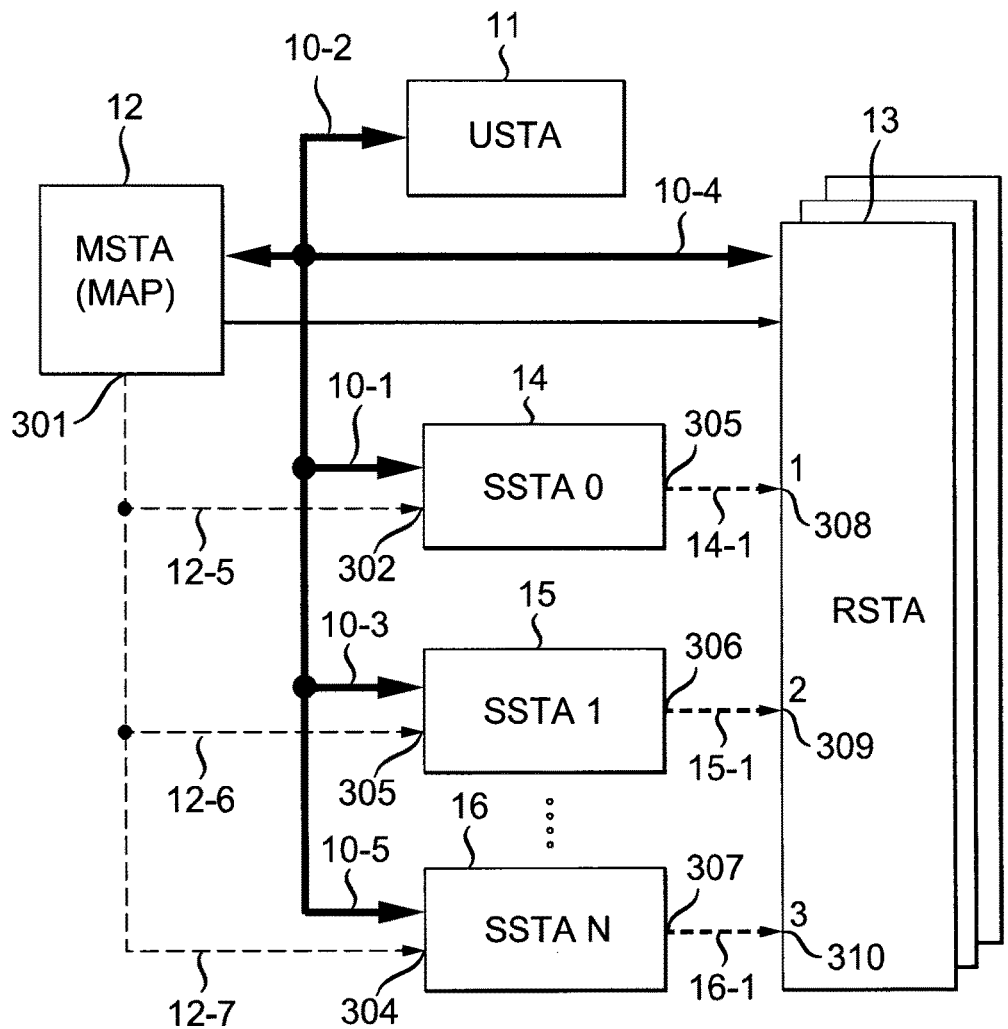
FIG. 3 is a functional block diagram showing the determining of a mobile station's position when clock and frequency scales of master and slave base stations are synchronized using a separate communication link to transmit synchronized signals in accordance with an embodiment.

Turning our attention also to FIG. 3, the exchange of the aforementioned signals is further illustrated in that synchronization port 301 of master base station 12 generates synchronization (timing) signals 12-5, 12-6, and 12-7 for receipt by slave base stations 14, 15, 16 through synchronization ports 302, 303, and 304 of slave base stations 14, 15, 16. Output navigation ports 305, 306, and 307, respectively, of slave base stations 14, 15, 16 are connected to corresponding navigation ports 308, 309, and 310 of mobile station(s) 13 for communication across the transmission medium.

Therefore, to achieve the position determination of mobile station(s) 13, master base station 12 (which is acting, in accordance with the embodiment, as a Wi-Fi access point), transmits communication signals 10-1 through 10-5, such signals being modified signals according to the IEEE 802.11 protocol (also referred to herein as "the 802.11 protocol"). These signals have at least an information component corresponding to the 802.11 protocol and a separate navigation component intended for positioning moving objects. Moreover, master base station 12 generates and transmits synchronization signals 12-5 through 12-7 to slave base stations 14, 15, 16 using the infrastructure of a separate data transmission network (not shown), for example, a cable communication network in a well-known manner. Slave base stations 14, 15, 16 generate and sequentially in time transmit navigation signals 14-1, 15-1, and 16-1 based on the received synchronization signals (i.e., synchronization signals 12-5 through 12-7). Master station(s) 13 receive signals (i.e., communication signal 10-4, and navigation signals 12-2, 14-1, 15-1, and 16-1, respectively) from master station 12 and slave base stations 14, 15, and 16 and determines its coordinates based on, illustratively, a range-difference method which is a well-known methodology for such purposes.

Figure 2:
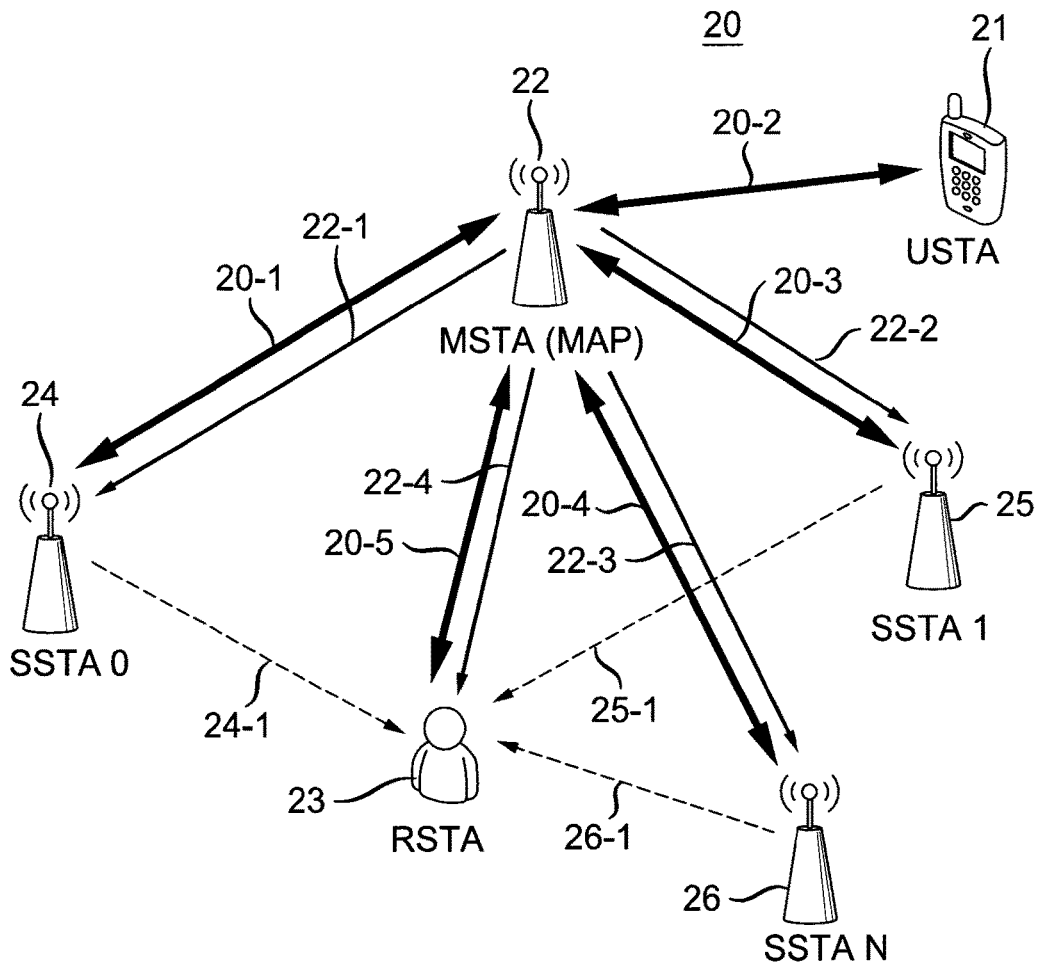
FIG. 2 is a diagram illustrating a mobile station's position determination when clock and frequency scales of master and slave base stations are synchronized using radio signals transmitted by a master base station in accordance with an embodiment.
Figure 2:
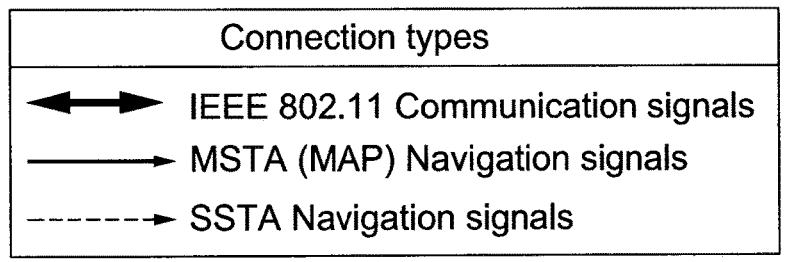

FIG. 2 shows diagram 20 illustrating a further embodiment in which a mobile station's position determination when clock and frequency scales of master and slave base stations are synchronized using radio signals transmitted by the master base station. In accordance with the embodiment, master base station 22 exchanges communication signals 20-1, 20-2, 20-3, 20-4, and 20-5 (illustratively, modified Wi-Fi signals conforming with the 802.11 protocol) using information (antenna) ports (not shown) through a transmission medium which are connected with corresponding information (antenna) ports (not shown) of user station 21, slave base stations 24, 25, 26, and mobile station(s) 23, all of the foregoing devices capable of exchanging data in accordance with the 802.11 protocol.

Figure 4:
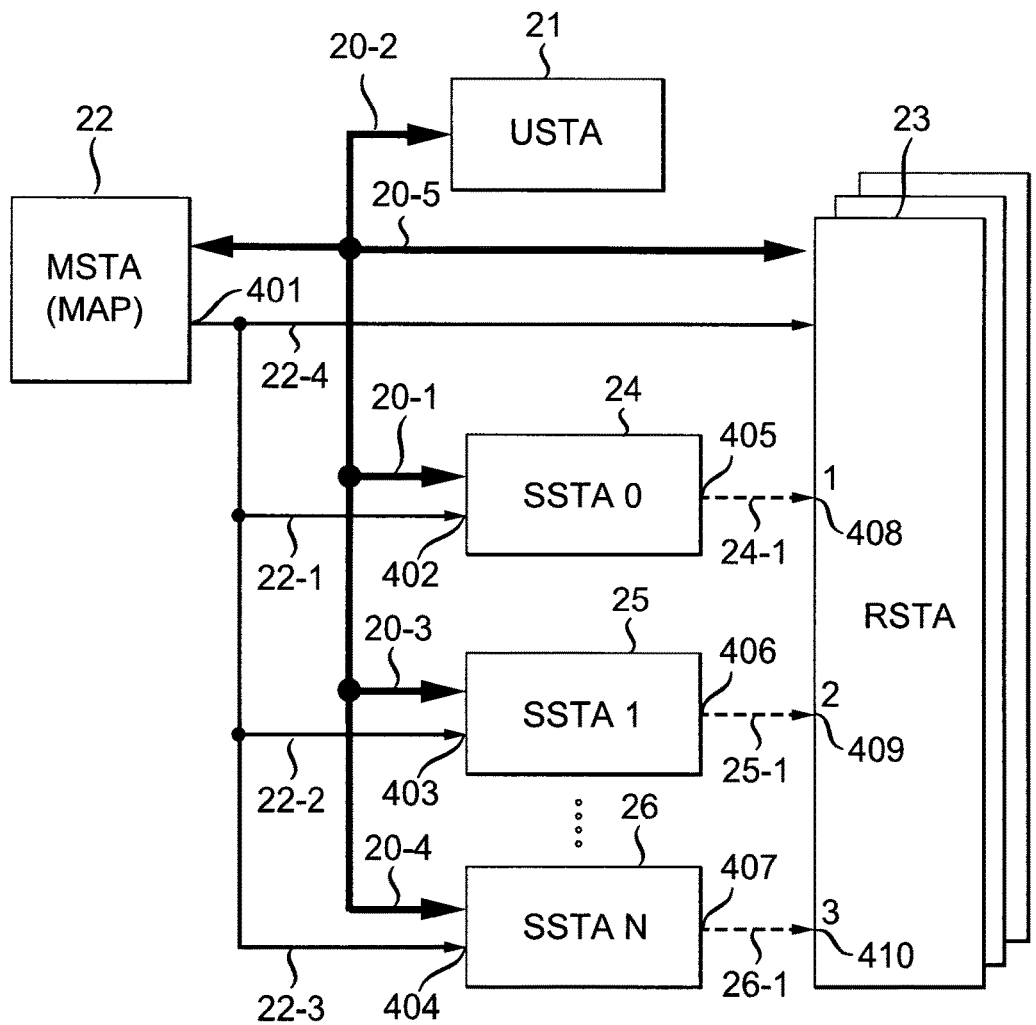
FIG. 4 is a functional block diagram showing the determining of a mobile station's position when clock and frequency scales of master and slave base stations are synchronized using radio signals transmitted by a master base station in accordance with an embodiment.
Figure 4:
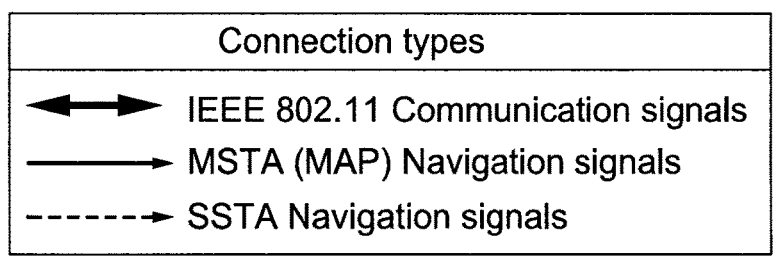

Turning our attention also to FIG. 4, the exchange of the aforementioned signals is further illustrated in that navigation port 401 of master base station 22 generates MSTA navigation signals 22-1, 22-2, 22-3, and 22-4 for receipt by slave base stations 24, 25, and 26 through the transmission medium to navigation ports 402, 403, and 404. Output navigation ports 405, 406, and 407, respectively, of slave base stations 24, 25, and 26 generate SSTA navigation signals 24-1, 25-1, and 26-1. MSTA navigation signals 22-1 through 22-4 and SSTA navigation signals 24-1, 25-1, and 26-1 are transferred together with communications signals 20-1 through 20-5 through the transmission medium, and connected to receiving navigation port 408, 409, and 410 of mobile station(s) 23, and to corresponding synchronization ports 402, 403, and 404 of slave base stations 24, 25, 26. For clarity, the Figures herein also designate certain ports with certain number designations "1", "2", "3", etc. to show illustrative interconnections between certain ports as shown in corresponding FIG. 11 herein. Further output navigation ports 405, 406, and 407 of slave base stations 24, 25, 26, are connected through the transmission to corresponding navigation ports 408, 409, and 410 of mobile station(s) 23. Mobile station(s) 23 receive signals (i.e., communications signals 20-1 through 20-5, and MSTA navigation signals 22-1 through 22-4, and SSTA navigation signals 24-1, 25-1, and 26-1, respectively) exchanged by master base station 22, slave base stations 24, 25, and 26, and user stations 21 and determines its coordinates based on, illustratively, a range-difference method which is a well-known methodology for such purposes.

Figure 15:
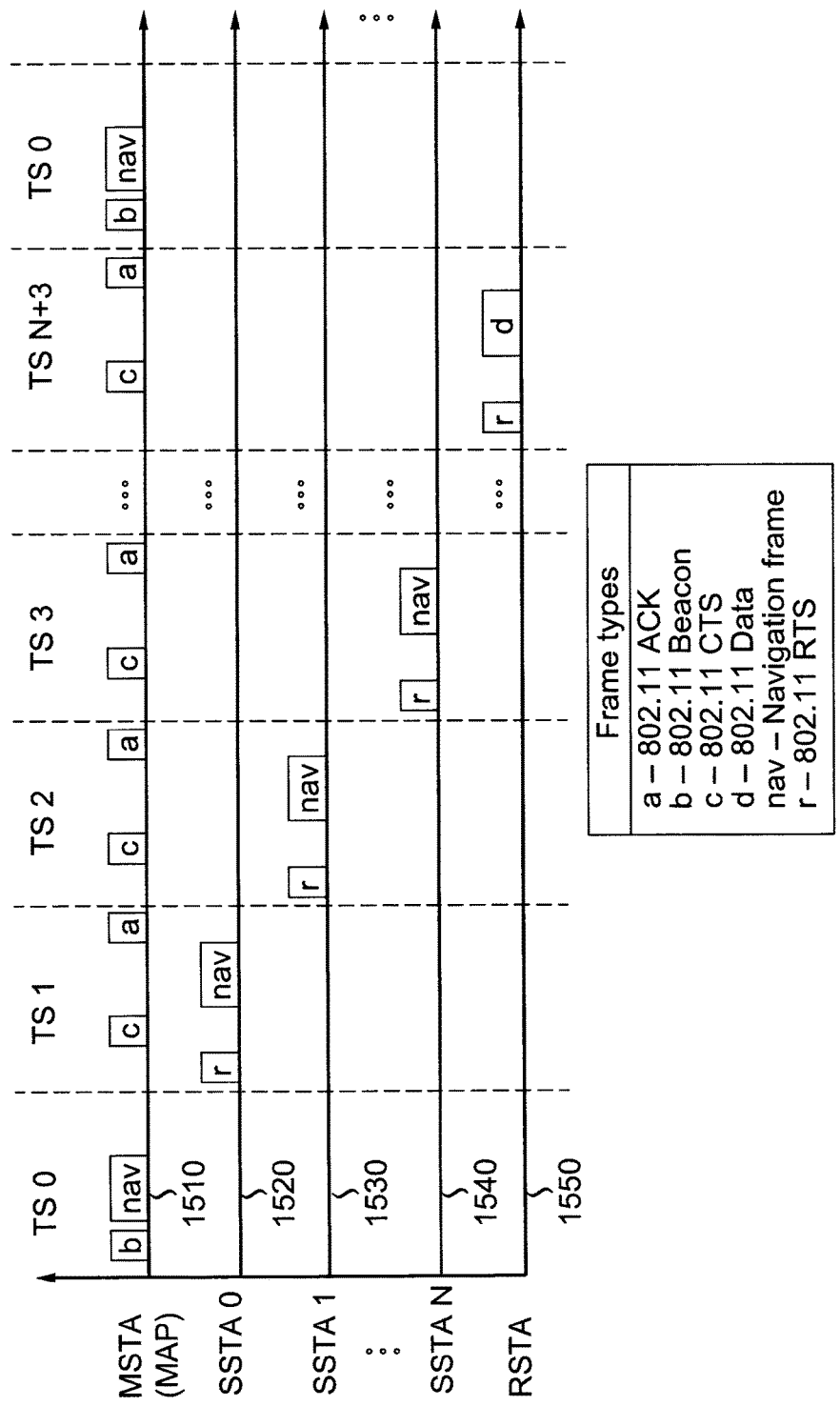
FIG. 15 shows a variety timing diagrams illustrating the structure and the order of signal transmission by master and slave stations, and a mobile user when a standard IEEE 802.11 data exchange mechanism is applied in accordance with an embodiment.
Figure 16:
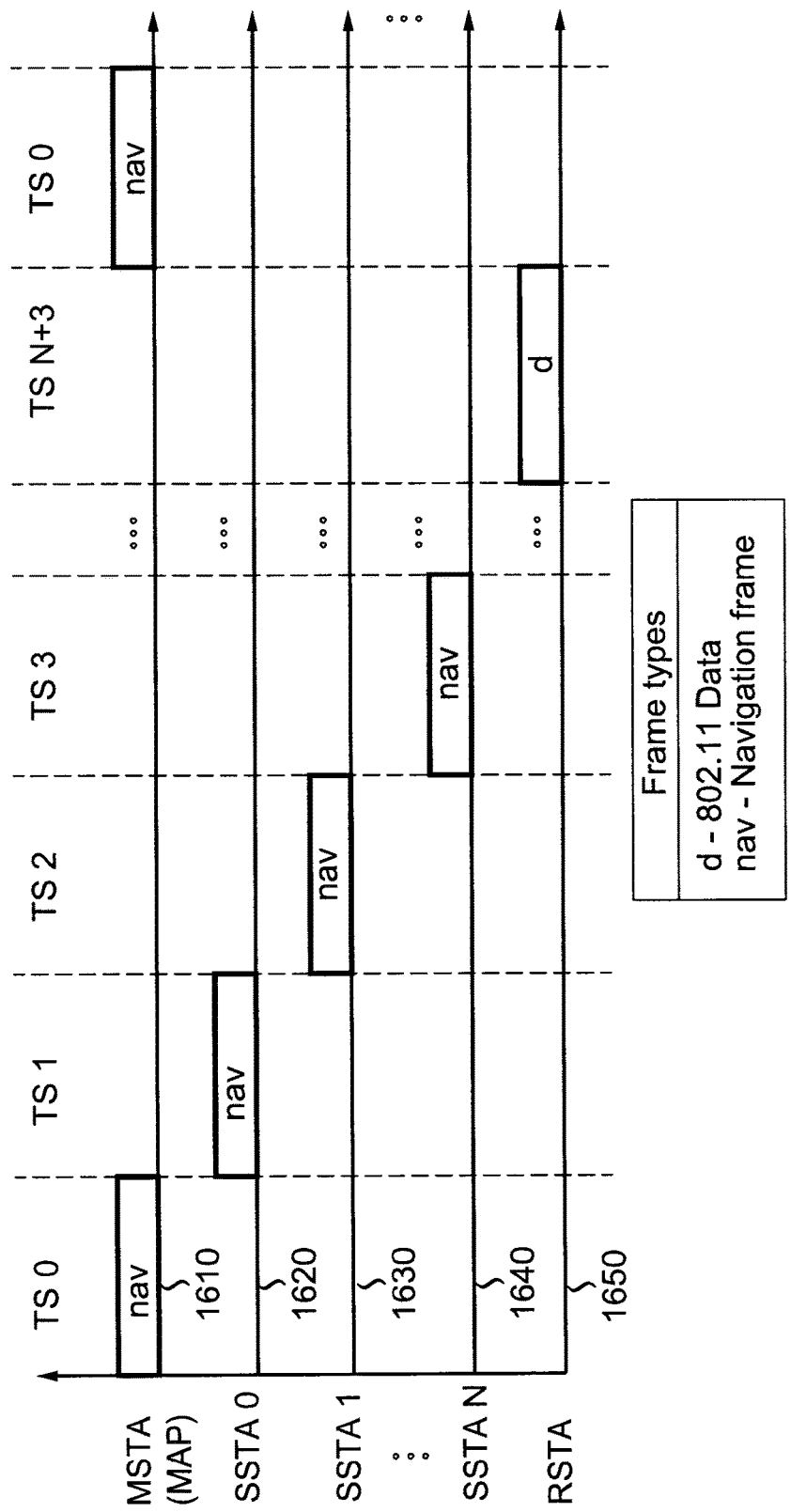
FIG. 16 shows a variety of time slot diagrams generated by a master and slave base stations, and a mobile user when the first variant of a modified data exchange mechanism is used in accordance with an embodiment.
Figure 17:
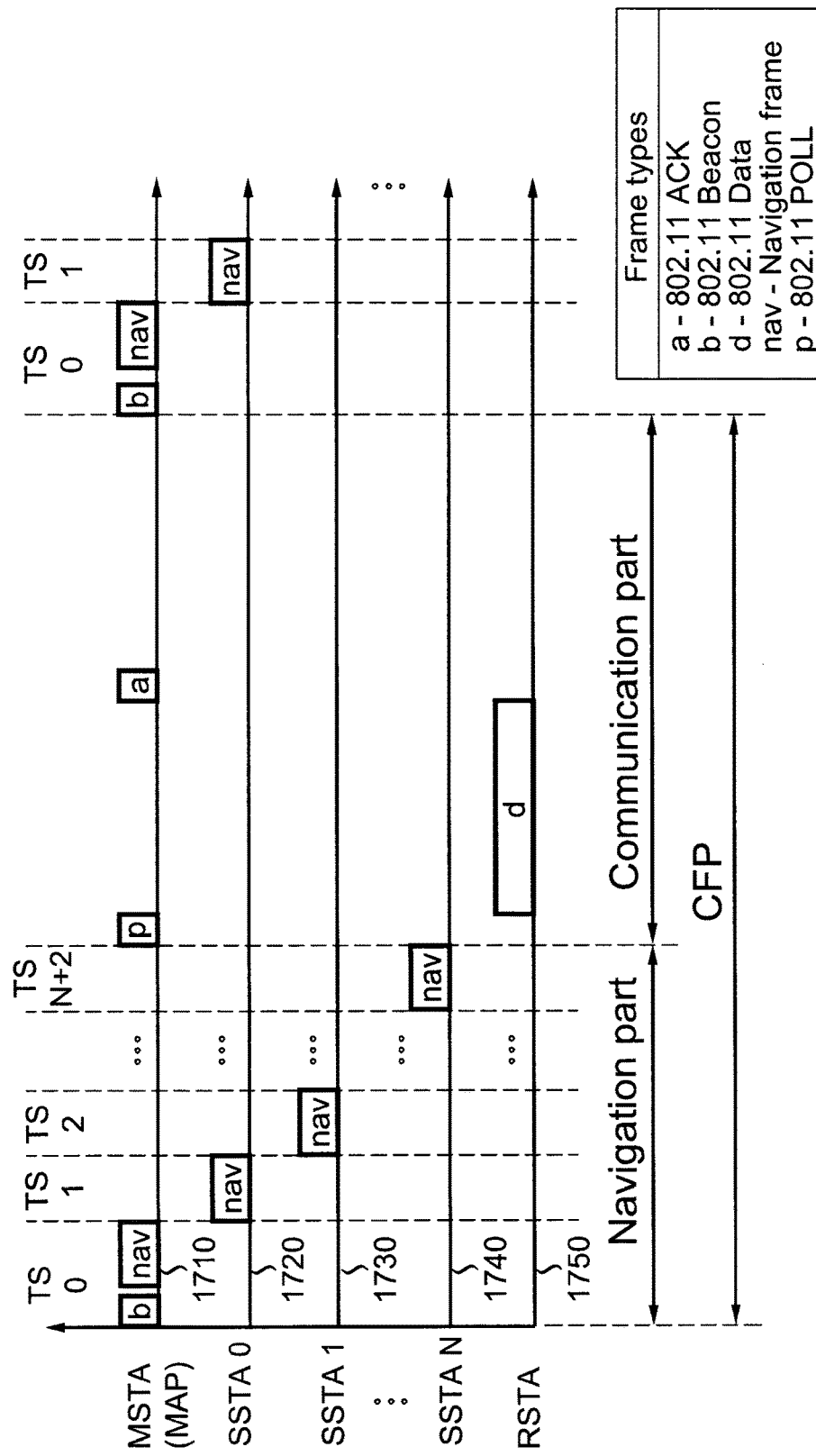
FIG. 17 shows a variety of time slot diagrams generated by a master and slave base stations, and a mobile user when the second variant of a modified data exchange mechanism is used in accordance with an embodiment.

In accordance with the embodiment, information (antenna) ports for exchanging data from master base station 22 that use modified Wi-Fi signals through a transmission medium are connected with corresponding information (antenna) ports of user stations 21, slave base stations 24, 25, 26, and mobile station(s) 23, as detailed above, and provide data exchange between these objects in accordance with the timing diagrams as shown in FIGS. 15, 16, and 17 herein, thereby forming time division multiple access with dedicated time slots for each STA unlike particular random access in typical operations in accordance with the 802.11 protocol. A navigation port of master base station 22 generates navigation and synchronization signals, which are combined with modified Wi-Fi signals through the transmission medium, and is connected to a receiving navigation port of mobile station(s) 23, and to corresponding synchronization ports of slave base stations 24, 25, 26, as detailed above. The output navigation ports of slave base stations 24, 25, 26 through the transmission medium are connected to corresponding navigation ports of mobile station(s) 23.

Thus, the mobile station(s) receive signals from master base and slave stations and determine their coordinates using a range-difference method.

Figure 5:
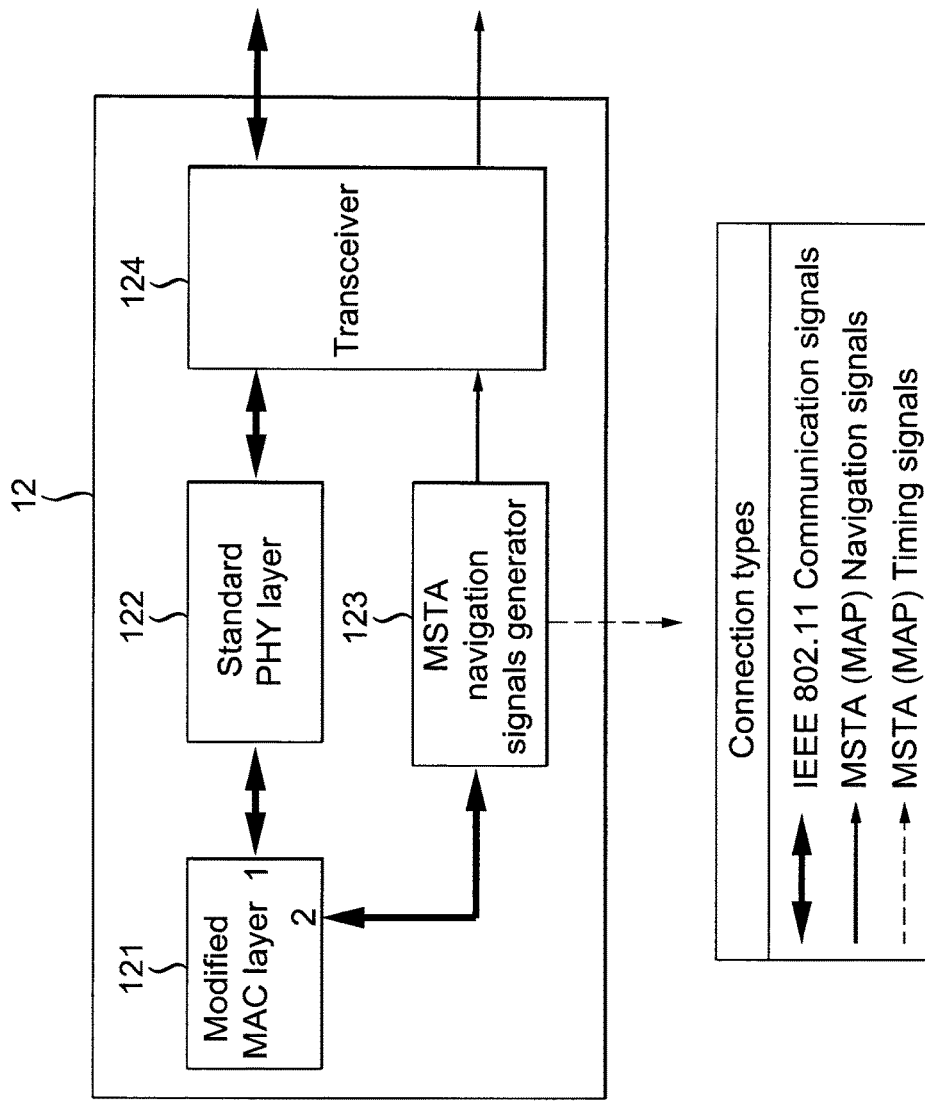
FIG. 5 is a functional block diagram of the master base station shown in FIG. 1 in accordance with an embodiment.

FIG. 5 is a functional block diagram of master base station 12 shown in FIG. 1 in accordance with an embodiment. In accordance with the embodiment, master base station 12 is configured in the form of sequentially connected blocks via information exchange ports, that is, modified MAC layer generation block 121, standard PHY layer block 122, transceiver 124, as well as navigation signal generator 123. The second data exchange port of modified MAC layer generation block 121 is connected to a corresponding port of navigation signal generator 123, the navigation output of which is connected to the corresponding input of transceiver 124. In turn, the synchronized output is the synchronized output of master base station 12, and the information and navigation outputs of which are corresponding logical outputs of transceiver 124 combined into a single physical signal.

In this case, a signal transmitted by master base station 12 includes both information and navigation components which are combined in transceiver 124. The first component is generated in standard PHY layer block 122 with well-known methods relevant to the 802.11 protocol based on the data from modified MAC layer generation block 121. The second component is generated by navigation signal generator 123 based on additional parameters entered into modified MAC layer block 121.

Figure 6:
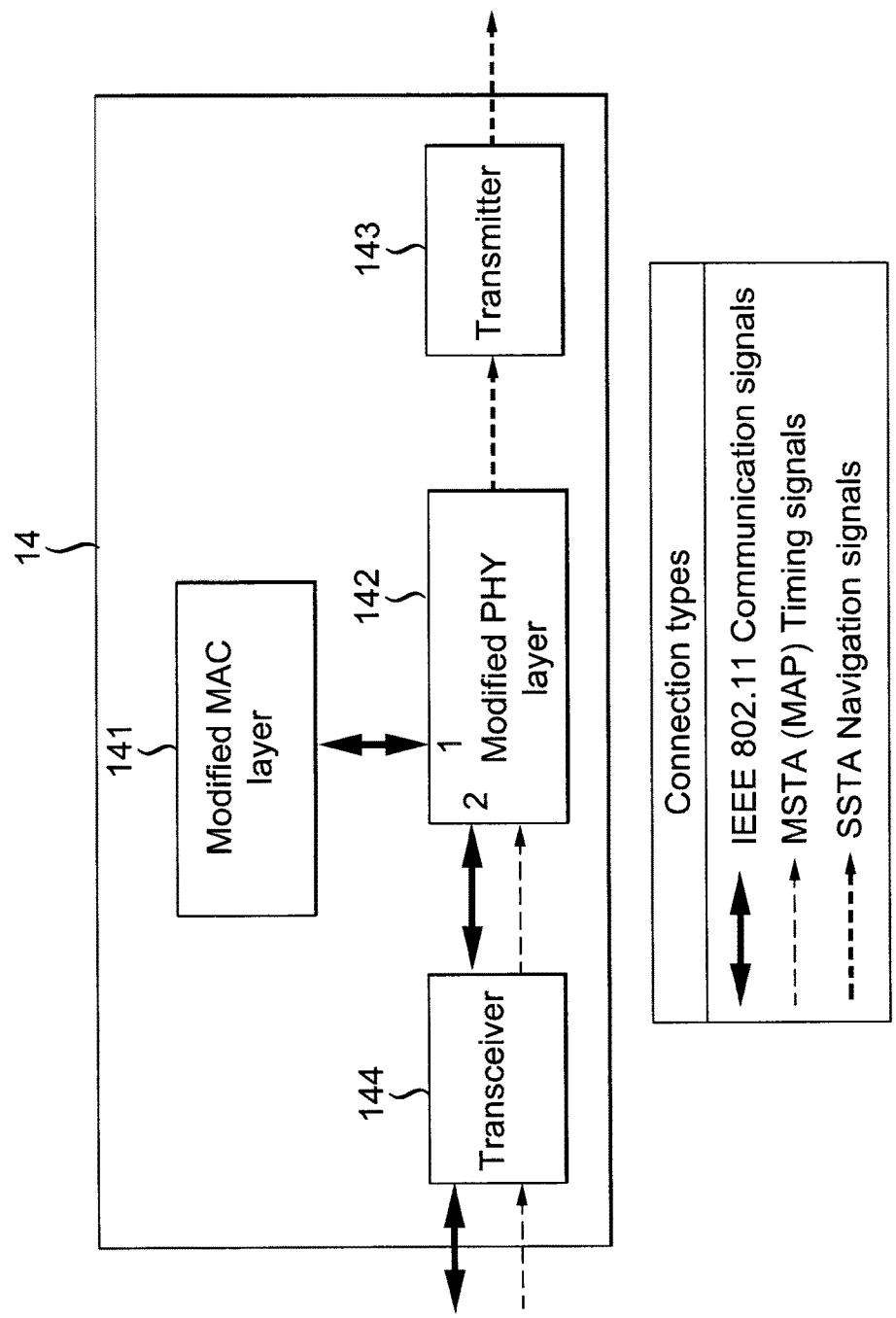
FIG. 6 is a functional block diagram showing a structural scheme of the slave base stations shown in FIG. 1 in accordance with an embodiment.

FIG. 6 is a functional block diagram showing a structural scheme of slave base station 14 shown in FIG. 1 in accordance with an embodiment. In accordance with the embodiment, slave base station 14 is configured (it will be noted that while FIG. 6 is focused on slave base station 14, the description thereof is equally applicable to slave base stations 15 and 16) as sequentially connected transceiver 144, modified physical layer generation block 142 and transmitter 143, as well as modified MAC layer generation block 141. A data exchange port of which is connected to a first data exchange port of modified physical layer generation block 142, and a data exchange port of slave base station 14 being an input data exchange port of transceiver 144, an output data exchange port of which is connected to a second modified physical layer generation block 142. A synchronized input of slave base station 14 is connected to a corresponding synchronized input of modified physical layer generation block 142, with the output of slave base station 14 being the output of transmitter 143.

As shown in FIG. 6, slave base station 14 functions as follows: a signal transmitted by master base station 12 is received by transceiver 144 along with a synchronization signal from master base station 12 via a separate network (e.g., a cable network). These signals are then demodulated and communicated to modified physical layer generation block 142, where the information signal corresponding to the 802.11 protocol is isolated and transmitted to modified MAC layer generation block 141 for further usage. Through this configuration of channel master and slave base stations an exchange of service and control information is enabled. In addition, modified physical layer generation block 142 generates navigation signals based on the received synchronization signals and control information, with the navigation signals being transmitted over air by transmitter 143 in a well-known fashion.

Figure 7:
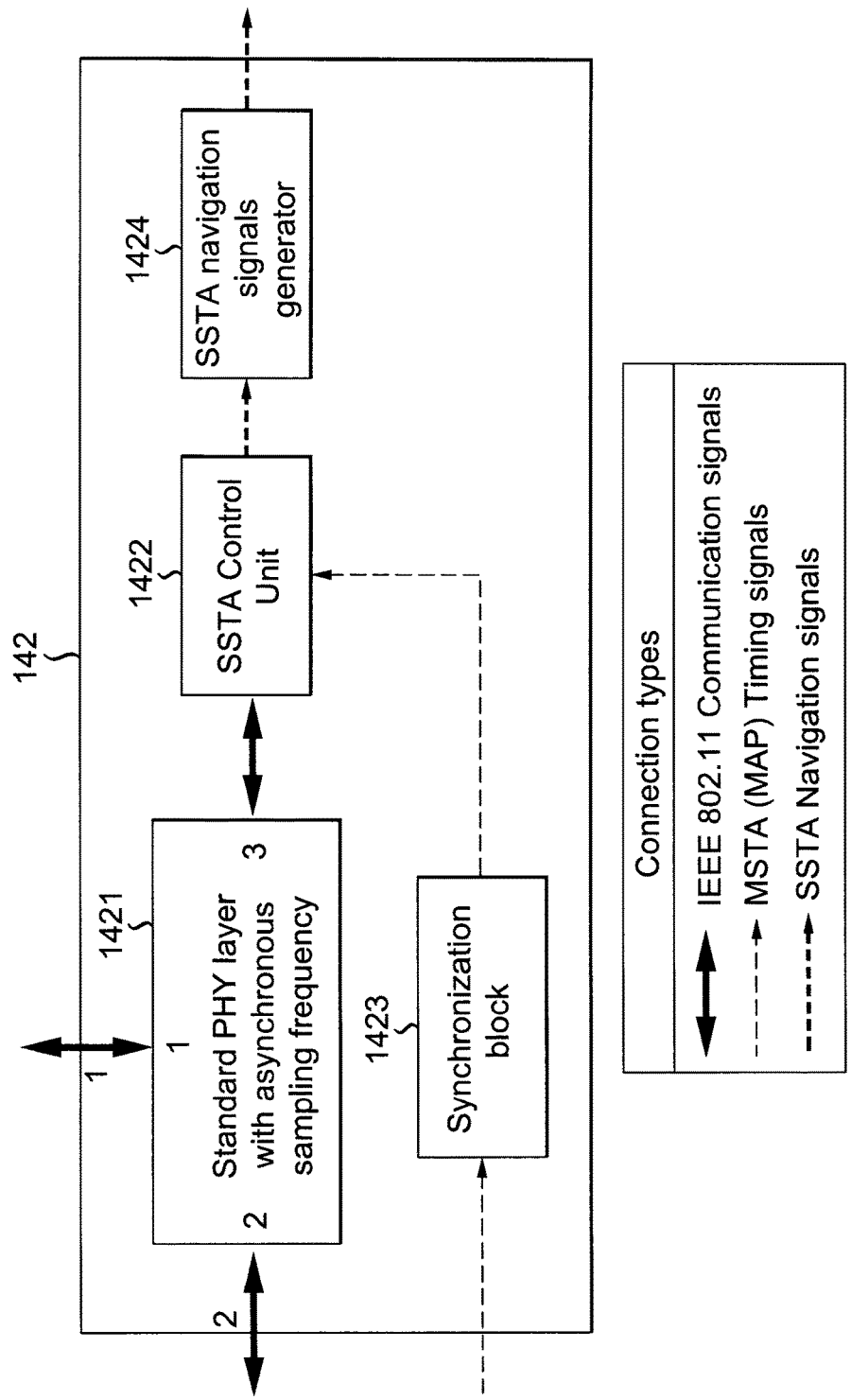
FIG. 7 is a functional block diagram showing a modified PHY layer block of one of the slave stations shown in FIG. 6 in accordance with an embodiment.

FIG. 7 is a functional block diagram showing modified PHY layer block 142 shown in FIG. 6 in accordance with an embodiment. In particular, modified physical layer generation block 142 is configured as a sequentially connected transceiver 1421 having an asynchronous sampling frequency, SSTA control unit 1422, and transmitter 1424, as well as synchronization block 1423. The first data exchange port of transceiver 1421 being the first data exchange port of modified physical layer signal generation block 142, and the second data exchange port of transceiver 1421 being the second data exchange port of modified physical layer generation block 142. Further, the input of synchronization block 1423 is the synchronization input of modified physical layer generation block 142, and the output of transmitter 1424 is the output of modified physical layer generation block 142

As shown in FIG. 7, modified physical layer generation block 142 operates as follows: the 802.11 protocol information signal isolated by transceiver 144 and provided to transceiver 1421 and after necessary standard signal conversions the signal is further transmitted to modified MAC layer generation block 141. Also, signals required to be transmitted to master station 12 (serving as an access point) according to the 802.11 protocol can be transmitted back. Moreover, a part of the received data is sent to control block 1422 together with synchronization signals, and, based on these signals, control block 1422 generates navigation signals at a required time moment, and these signals are further transmitted (on air) by transmitter 1424.

Figure 8:
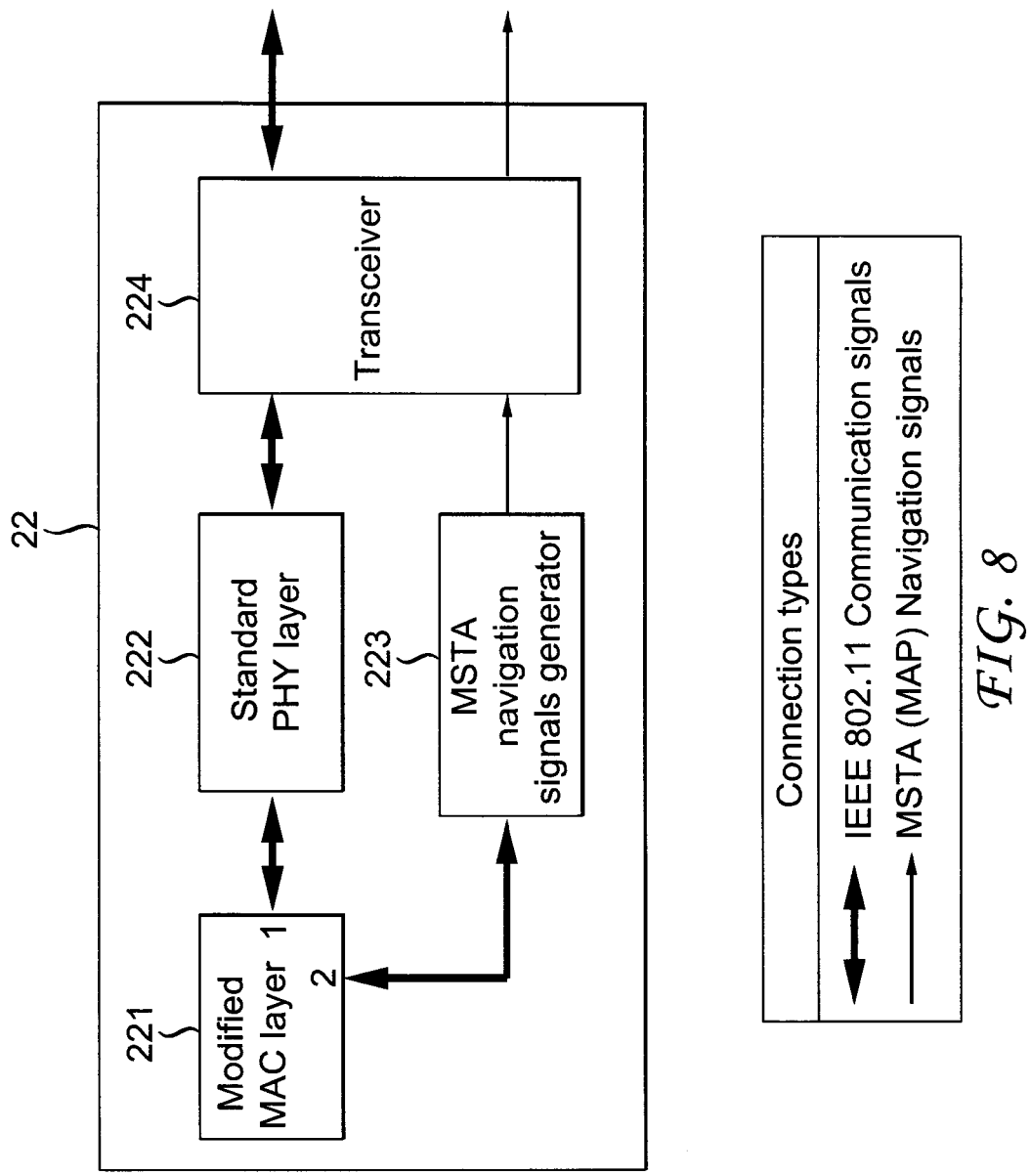
FIG. 8 is a functional block diagram of the master base station shown in FIG. 2 in accordance with an embodiment.

FIG. 8 is a functional block diagram of master base station shown 22 in FIG. 2 in accordance with an embodiment. In accordance with embodiment, master base station 22 is configured in the form of sequentially connected blocks through data exchange ports of modified MAC layer generation block 221, standard physical layer block 222, transceiver 224, and navigation signal generation block 223. The second data exchange port of modified MAC layer generation block 221 is connected to a corresponding port of navigation signal generation block 223, the navigation output of which is connected to a corresponding input of transceiver 224, and the synchronization output is the synchronization output of master base station 22. Further, the information and navigation outputs of these blocks are corresponding logical outputs of transceiver 224 which are combined into a single physical signal.

In this configuration, the signal transmitted by master base station 22 contains information and navigation components combined in transceiver 224. The first component is generated in a standard physical layer block 222 by standard methods in accordance with the 802.11 protocol based on data received from modified MAC layer generation block 221, and the second component is generated by navigation signal generation block 223 on the basis of additional parameters entered into modified MAC layer generation block 221.

Figure 9:
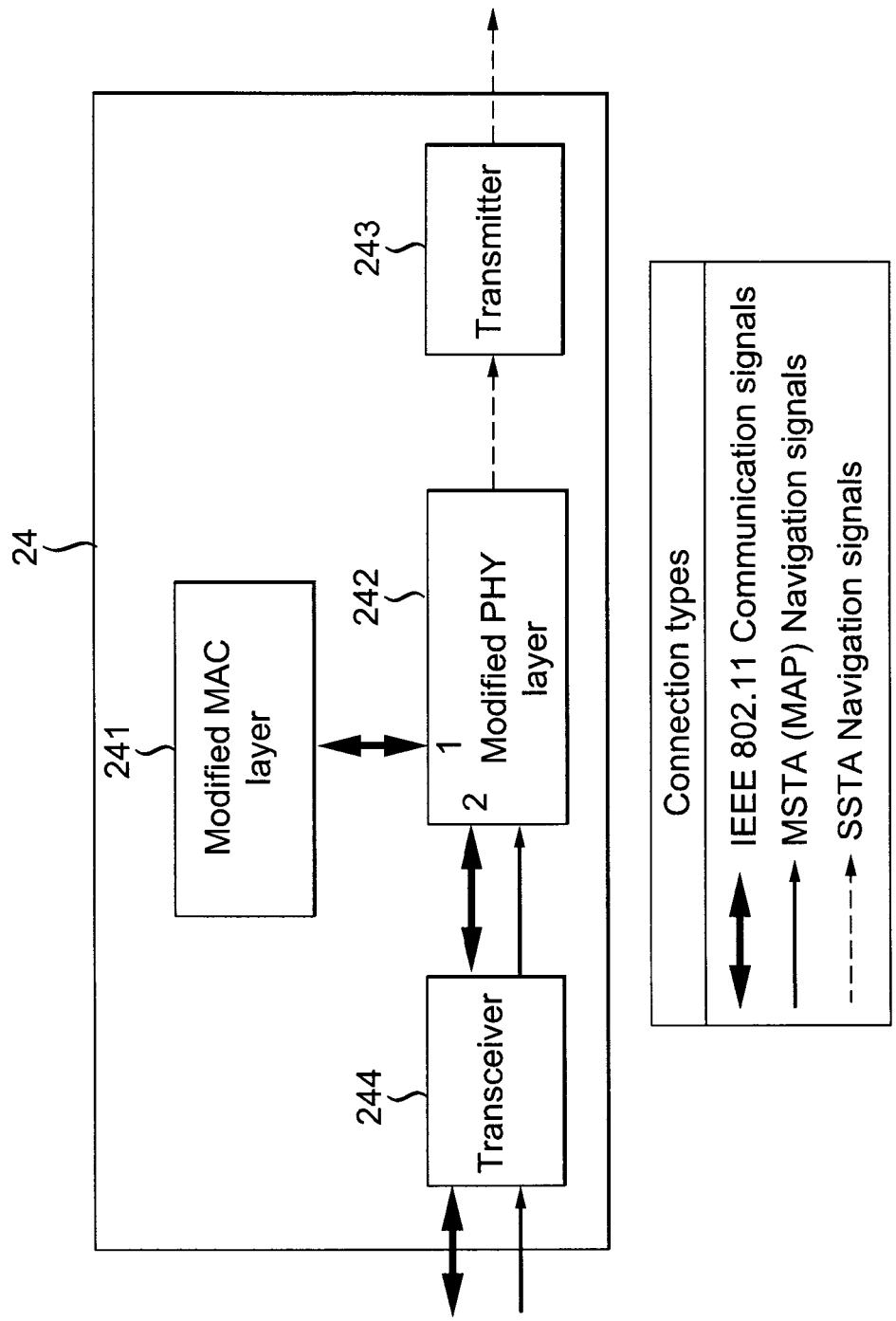
FIG. 9 is a functional block diagram showing a structural scheme of the slave base stations shown in FIG. 2 in accordance with an embodiment.

FIG. 9 is a functional block diagram showing a structural scheme of slave base station 24 shown in FIG. 2 in accordance with an embodiment. In accordance with embodiment, slave base station 24 (for ease of illustration only this slave base station is shown but slave base station 25 and 26 share the same configuration) is made as sequentially connected transceiver 244, modified physical layer generation block 242 and transmitter 243. Modified MAC layer generation block 241 with a data exchange port of which is connected with a first data exchange port of modified physical layer generation block 242, the data exchange port of slave station 24 being an input data exchange port of transceiver 244, and the output data exchange port of which is connected to a second data exchange port of modified physical layer generation block 242. A synchronization input of slave station 24 is connected to a corresponding synchronization input of modified physical layer generation block 242 and the output of slave station 24 is associated with the output of transmitter 243.

In this configuration, slave base station 24 operates such that a radio signal transmitted by master base station 22 is received by transceiver 244 along with a synchronization signal from master base station 22 via a separate network (e.g., a cable network). Once these signals are demodulated, and provided to modified physical layer generation block 242, the information signal corresponding to the 802.11 protocol is isolated and transmitted to the modified MAC layer generation block 241 for further usage. The master and slave base stations also exchange service and control information in a well-known manner. In addition, modified physical layer generation block 242 generates navigation signals based on the received synchronization signals and control information, where the navigation signals are transmitted over air by transmitter 243.

Figure 10:
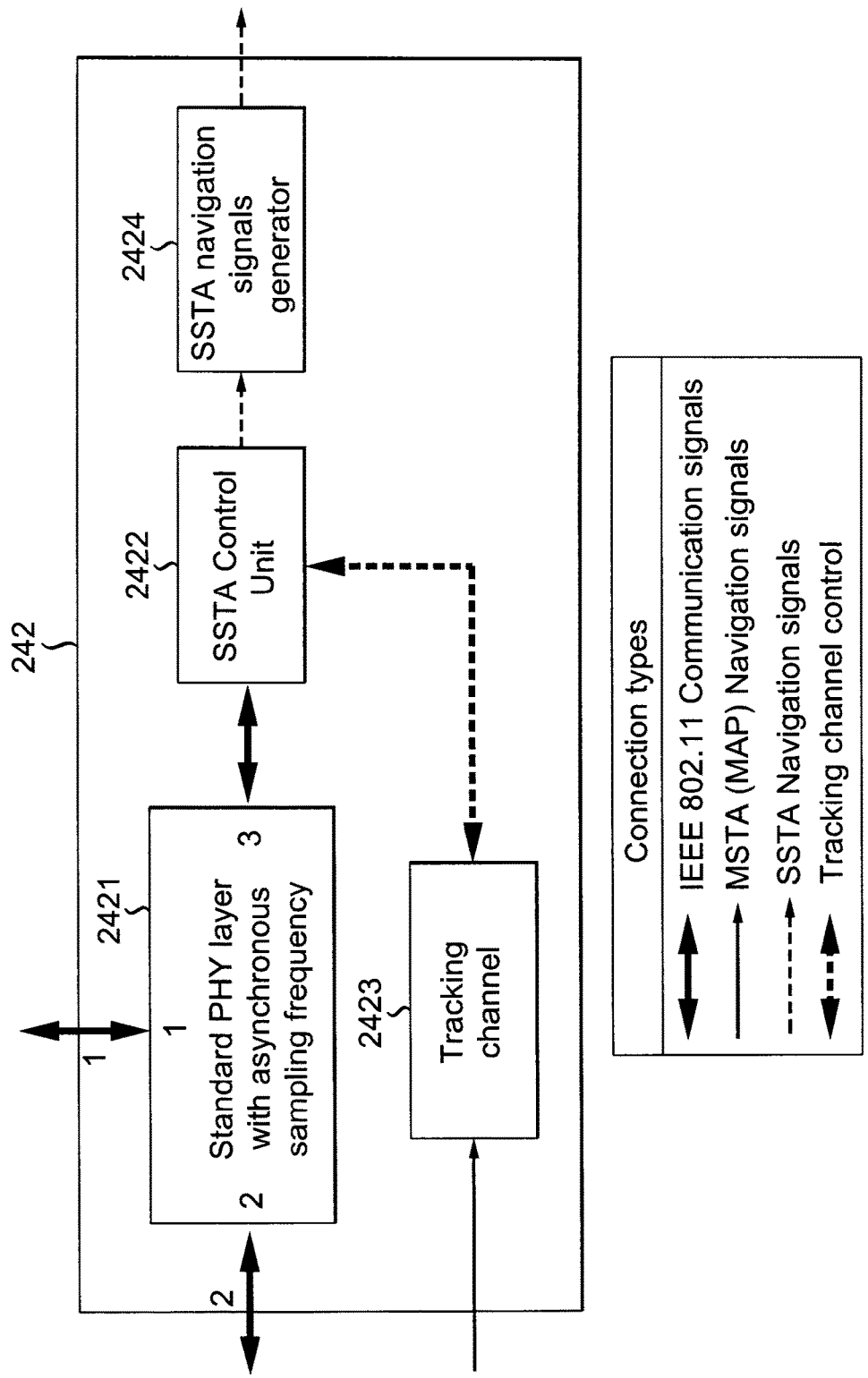
FIG. 10 is a functional block diagram showing a modified PHY layer block of FIG. 9 in accordance with an embodiment.

FIG. 10 is a functional block diagram showing the modified PHY layer block 242 of FIG. 9 in accordance with an embodiment. In accordance with the embodiment, modified physical layer generation block 242 is configured as a sequentially connected transceiver 2421 with asynchronous sampling frequency, SSTA control unit 2422 and transmitter 2424, as well as a tracking channel 2423, with the first data exchange port of transceiver 2421 being a first data exchange port of modified physical layer generation block 242, and the second data exchange port of transceiver 2421 being a second data exchange port of modified physical layer generation block 242. Further, the input of tracking channel 2423 is the synchronization input of modified physical layer generation block 242, and the output of transmitter 2424 is the output of modified physical layer generation block 242.

The operation of modified physical layer generation block 242 is such that the 802.11 protocol information signal isolated by transceiver 244 and provided to transceiver 2421 and after necessary and standard conversions the signal is further transmitted to modified MAC layer generation block 241, and signals required to be transmitted to master station 22 according to the 802.11 protocol can be transmitted back. Moreover, a part of received data is sent to control block 2422 together with synchronization signals. Based on these signals, control block 2422 generates navigation signals at a required time moment, and these signals are further transmitted on air by transmitter 2424.

Figure 11:
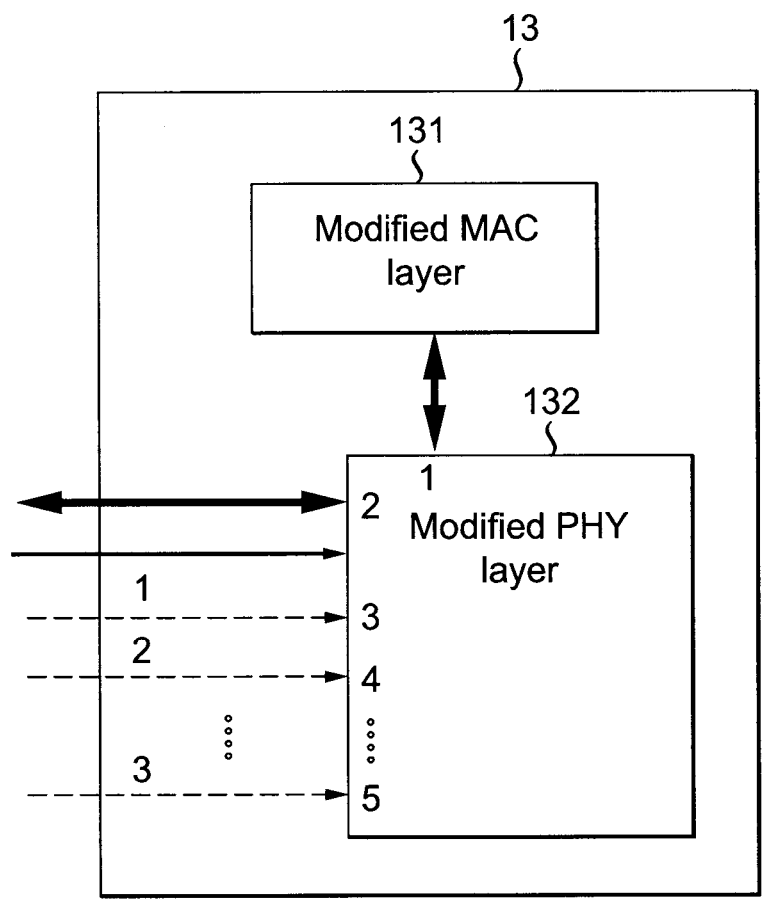
FIG. 11 is a functional block diagram of the mobile station shown in FIG. 1, in accordance with an embodiment.
Figure 11:
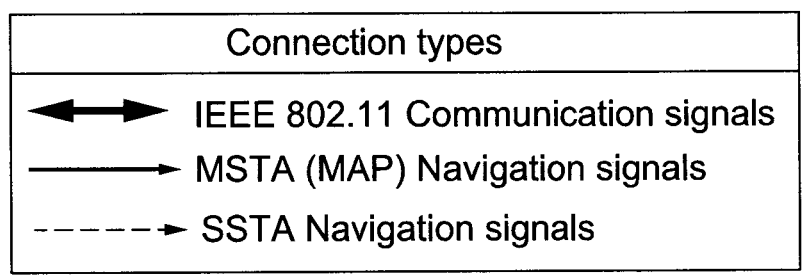

FIG. 11 is a functional block diagram of mobile station 13 shown in FIG. 1, in accordance with an embodiment. It will be understood that this discussion will apply equally to mobile station 23 shown in FIG. 2 as well but for brevity only mobile station 13 is shown. In accordance with the embodiment, mobile station 13 (e.g., a rover) includes modified MAC layer generation block 131 and modified physical layer generation block 132, with the data exchange port of modified MAC layer generation block 131 connected to a first data exchange port of modified physical layer generation block 132. Further, navigation inputs of mobile station 13 are navigation inputs of modified physical layer generation block 132.

Mobile station 13 exchanges information signals (e.g., in accordance with the 802.11 protocol) with master base station 12, and receive navigation signals from master base station 12 and slave base stations 14, 15, and 16. The signal from master base station 12 includes two components: information according to the 802.11 protocol, and a navigation component generated on the basis of certain rules, such rules will be discussed further herein below. Thereafter, the listed signals are provided to ports of modified physical layer generation block 132 that interacts with modified MAC layer generation block 131.

Figure 12:
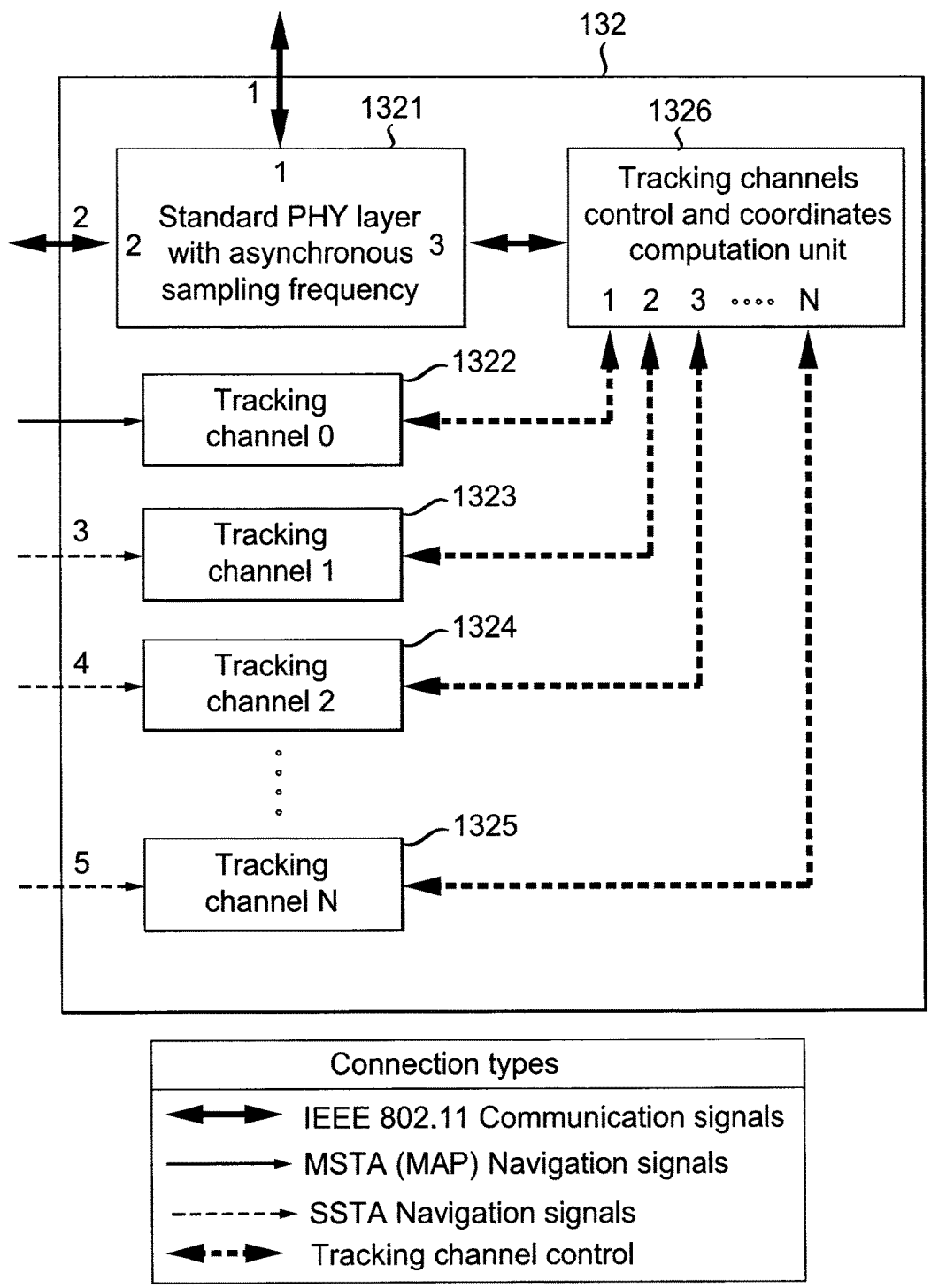
FIG. 12 is a functional block diagram of modified PHY layer block shown in FIG. 11 in accordance with an embodiment.

FIG. 12 is a functional block diagram of modified physical layer block 132 shown in FIG. 11 in accordance with an embodiment. In accordance with the embodiment, modified physical layer generation block 132 is configured with a standard transceiver 1321 with asynchronous sampling frequency, tracking channels control and coordinates computation unit 1326 and a number of tracking channels 1322, 1323, 1324 and 1325. The first and second data exchange ports of transceiver 1321 being respectively a first and second data exchange of modified physical layer generation block 132, the third data exchange port of transceiver 1321 being connected to a similar data exchange port of tracking channels control and coordinates computation unit 1326 such that certain ports of controlling tracking channels and transmitting navigation data are connected to corresponding ports of tracking channels 1322, 1323, 1324 and 1325, the inputs of which are corresponding navigation inputs of modified physical layer generation block 132.

The operations of modified physical layer block 132 are such that an information signal component transmitted by master base station 12 (or master base station 22) is provided to transceiver 1321 where MAC layer parameters are isolated and further transmitted to modified MAC layer generation block 131, and the MAC layer data can be transmitted back to master base station 12 (or master base stations 22).

Navigation signals received from master station 12 (or master base station 22) and slave stations 14, 15, and 16 (or slave stations 24, 25, and 26) in modified physical layer generation block 132 is provided to the corresponding channels tracking in code and phase 1322, 1323, 1324, and 1325. These tracking channels are connected to the corresponding ports of tracking channels control and coordinates computation unit 1326, where the mobile station's (e.g., mobile station 13 and/or 23) current coordinates are computed according to well-known algorithms and the range-difference method. Moreover, certain control commands may also be generated by modified physical layer block 132 using current data received via the Wi-Fi information channel from the tracking channels. These control commands can change tracking channel parameters in accordance with current operational conditions.

FIGS. 13(*a*) through (*d*) are diagrams showing various structures of different navigation frames and corresponding vector diagrams of modulation methods being used for a frame with long preambles in accordance with an embodiment. In particular, depending on conditions and system configurations one of four (4) frame structures (also referred to herein as a "type 1, 2, 3 or 4") can be selected for the physical layer frame transmitted by the master and slave stations. The basic structure, as shown, corresponds to the IEEE 802.11b protocol frame wherein SYNC is the long preamble, SFD (start frame delimiter) is the identification of frame start, SIGNAL is the signal format, SERVICE is the reserved field, LENGTH is the duration of the frame, CRC (cyclic redundancy check) is the check sum, MPDU is the field with a frame of MAC layer.

As shown in FIG. 13(*a*), navigation frame 1310 of type 1 is a standard frame according to the IEEE 802.11b protocol. In this case, as also illustrated in vector diagram 1310-1, tracking follows preamble SYNC. Any modulation can be used in this frame type (in accordance with the 802.11b protocol). As shown in FIG. 13(*b*), navigation frame 1320 of type 2 includes a PNS field containing a pseudorandom sequence for tracking, this field replaces the MPDU field (as shown in FIG. 13(a)) with a MAC layer frame. In this case, as also illustrated in vector diagram 1320-2, a binary phase manipulation is used in the signal.

Figure 13A:
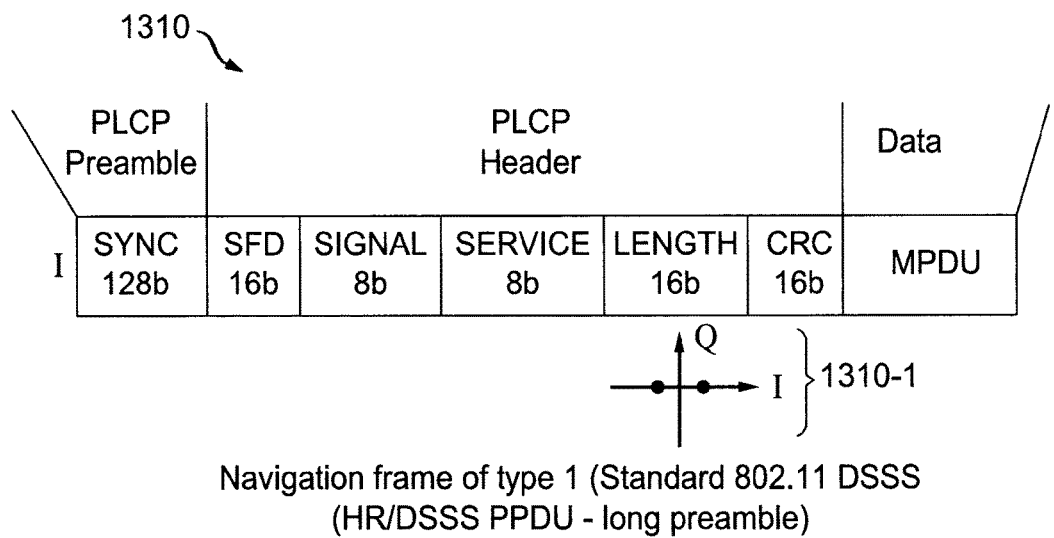
FIGS. 13(a) through (d) are diagrams showing various structures of different navigation frames and corresponding vector diagrams of modulation methods being used for a frame with long preambles in accordance with an embodiment.
Figure 13B:
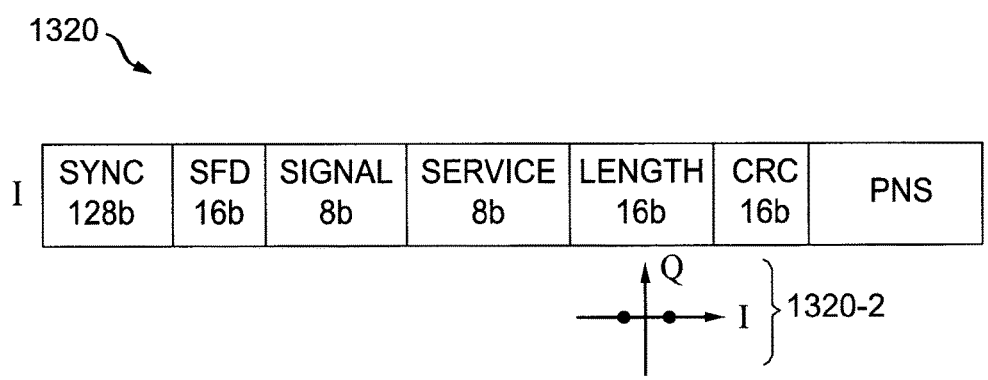
Figure 13C:
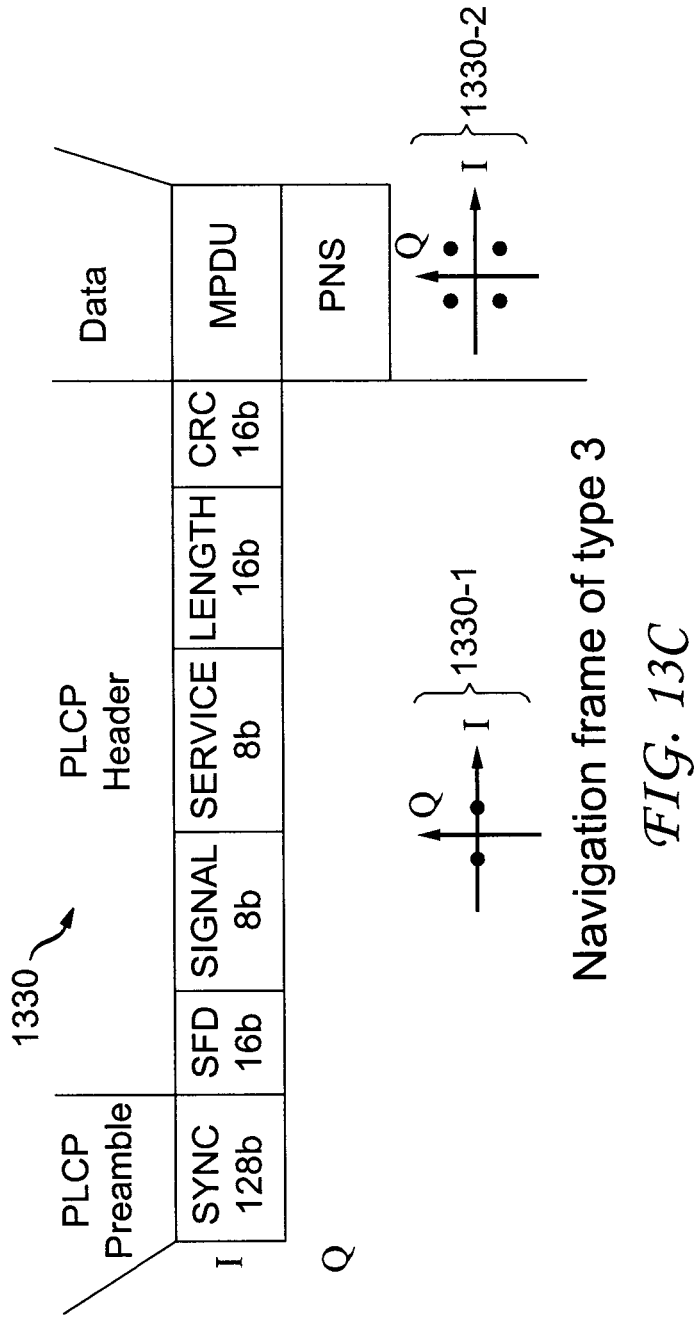

As shown in FIG. 13(c), navigation frame 1330 of type 3, includes a PNS field which is also used for tracking, but the navigation signal is generated in the quadrature component of the signal, whereas the in-phase component is used for MAC layer frame. The vector diagrams 1330-1 and 1330-2 show that PLCP-header corresponds to the IEEE 802.11b protocol and there is binary phase manipulation there, whereas in the main part of the frame there is quadrature phase manipulation.

Figure 13D:
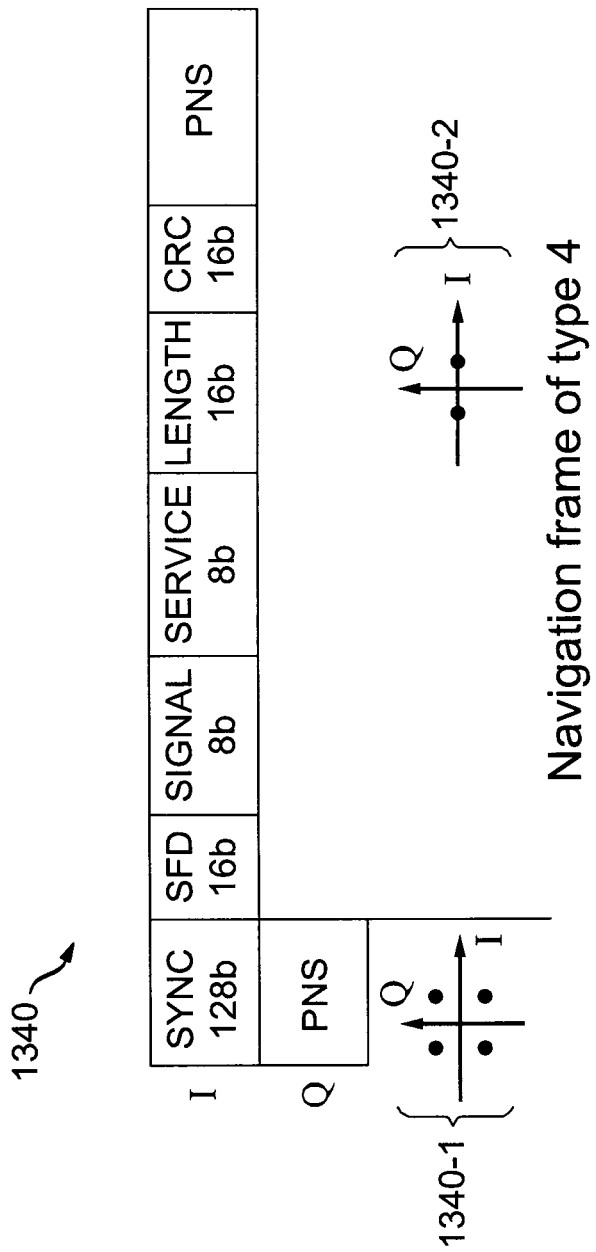

As shown in FIG. 13(d), navigation frame 1340 of type 4 has a PNS field which is used for tracking and also contains some pseudorandom sequence, the navigation signal being generated at the same time as SYNC preamble but in quadrature component of the signal (as also shown in vector diagrams 1340-1 and 1340-2). In the moment of transmitting preamble SYNC quadrature phase manipulation is used in the signal, whereas any other modulation in accordance with the IEEE 802.11b protocol, including binary phase manipulation, can be used in the rest frame fields.

Figure 14A:
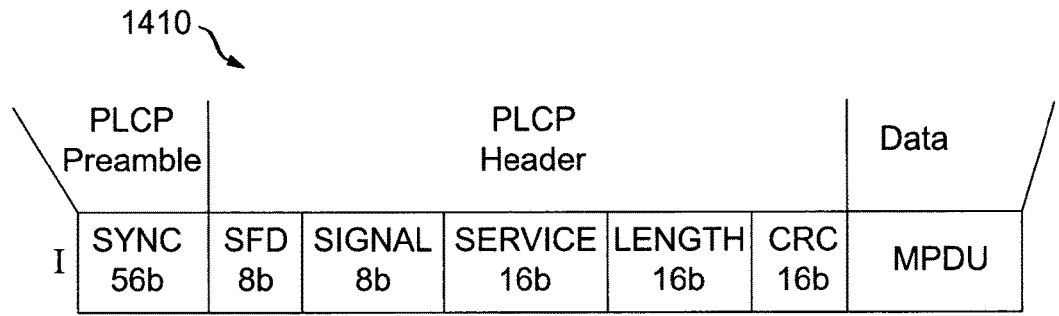
FIGS. 14(a) through (c) show diagrams of various structures of different navigation frames and corresponding vector diagrams of modulation methods being used for a frame with short preambles in accordance with an embodiment.
Figure 14B:
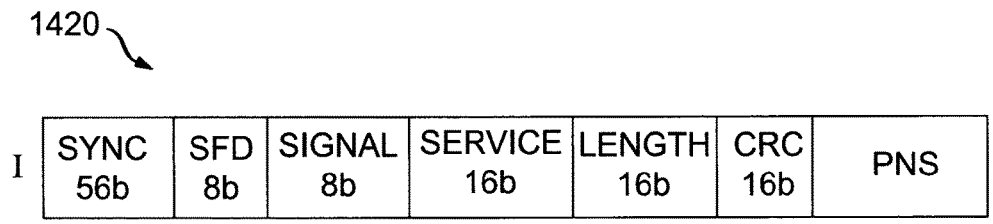
Figure 14C:
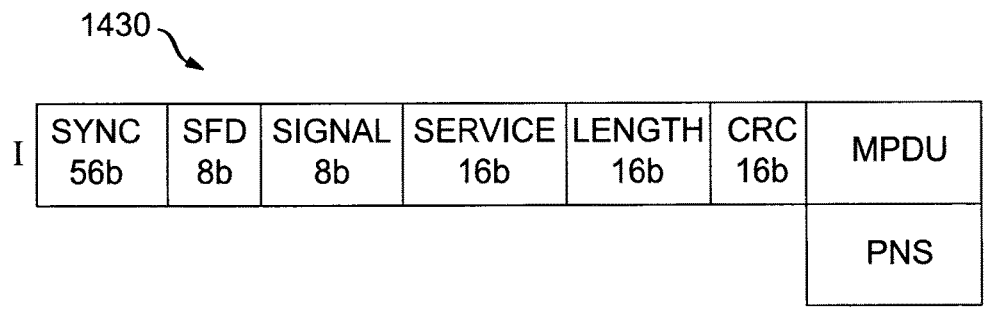

FIGS. 14(a) through (c) show diagrams of various structures of different navigation frames and corresponding vector diagrams of modulation methods being used for a frame with short preambles in accordance with an embodiment. A short SYNC preamble is used in physical layer frames according to the 802.11 protocol at high signal-to-noise ratios. As shown in FIG. 14(a), navigation frame 1410 of type 1 is a standard frame according to the 802.11b protocol. In this case tracking follows short SYNC preamble. Any modulation can be used in this frame type (in accordance with protocol). As shown in FIG. 14(b), navigation frame 1420 of type 2 includes a PNS field containing a pseudo-random sequence used for tracking, this field replaces the MPDU field (as shown in FIG. 14(a)) with MAC layer frame. In this case, a binary phase manipulation is used in the signal. As shown in FIG. 14(c), navigation frame 1430 of type 3 includes the PNS for tracking purposes, but the navigation signal is generated in the quadrature component of the signal, whereas the in-phase component is used for MAC layer frame.

FIG. 15 shows a variety timing diagrams 1510, 1520, 1530, 1540, and 1550 illustrating the structure and the order of signal transmission by master and slave stations, and a mobile user when a standard IEEE 802.11 data exchange mechanism is applied in accordance with an embodiment; To implement time-division multiplexing, a standard «RTS/CTS handshake» mechanism provided by the 802.11 protocol can be used, which includes the exchange of service frames RTS, CTS, DATA and ACK between two devices. As shown, these frames are designated respectively as r, c, d (or nav) etc. A time interval TS0 is allocated to the master station when the station transmits frames of type «Beacon» (b), and navigation frame (nav) follows it. Once slave stations (SSTA0, SSTA1, and SSTA N) receive signals from the master station, with time counters they calculate time intervals (TS1, TS2, and TS3), at which signals are to be transmitted, and at the calculated time they initiate the «RTS/CTS-handshake» mechanism at the master station thereby forcing the slave stations to transmit navigation frame as data. Further, rovers also can initiate data transmission by the same mechanism at an allocated time interval (TS N+3). The exchange, of frames described above is periodically performed by a super frame of type 1.

FIG. 16 shows a variety of time slot diagrams 1610, 1620, 1630, 1640, and 1650 generated by a master and slave base stations, and a mobile user when the first variant of a modified data exchange mechanism is used in accordance with an embodiment. Both service and interframe intervals are present in data exchange in case of using «RTS/CTS-handshake» mechanism. As such, part of the time is spent transmitting service information and waiting for the desired moment of transmission. To minimize such losses, one can employ the remove of interframe intervals. Master base station (MSTA) and slave base station (SSTA0, SSTA1, and SSTA N) stations successively transmit navigation frames at assigned time intervals (TS 0-TS N+3). If a time interval is allocated to a rover, it is to transmit an information frame. The frame exchange above is a super frame of type 2 and implemented periodically in accordance with the time slot diagrams shown in FIGS. 1610 through 1650.

FIG. 17 shows a variety of time slot diagrams 1710, 1720, 1730, 1740, and 1750 generated by a master and slave base stations, and a mobile user when the second variant of a modified data exchange mechanism is used in accordance with an embodiment. To implement time-division multiplexing, a hybrid coordination function (HCF) can be applied in accordance with the 802.11 protocol. In this case, the master station generates time intervals which are called a Contention-Free Period (CFP) when signal transmission is enabled by the master base station. These intervals, in turn, are divided into two parts: navigation and communication parts. During the navigation part, the master base station (MSTA) and slave base stations (SSTA0, SSTA1, SSTA N) sequentially transmit navigation frames at preset time intervals (TS 0-TS N+2). During the communication part, the master station polls the rover data using frame POLL (designated as "p" in FIG. 17). In reply, the rover transmits a data frame (designated as "d" in FIG. 17), and the master station generates frame ACK (designated as "a" in FIG. 17). Note that data exchange is to be completed before the CFP end. The frame exchange above is a super frame of type 3 and implemented periodically in accordance with the aforementioned time slot diagrams of FIG. 17.

Figure 18:
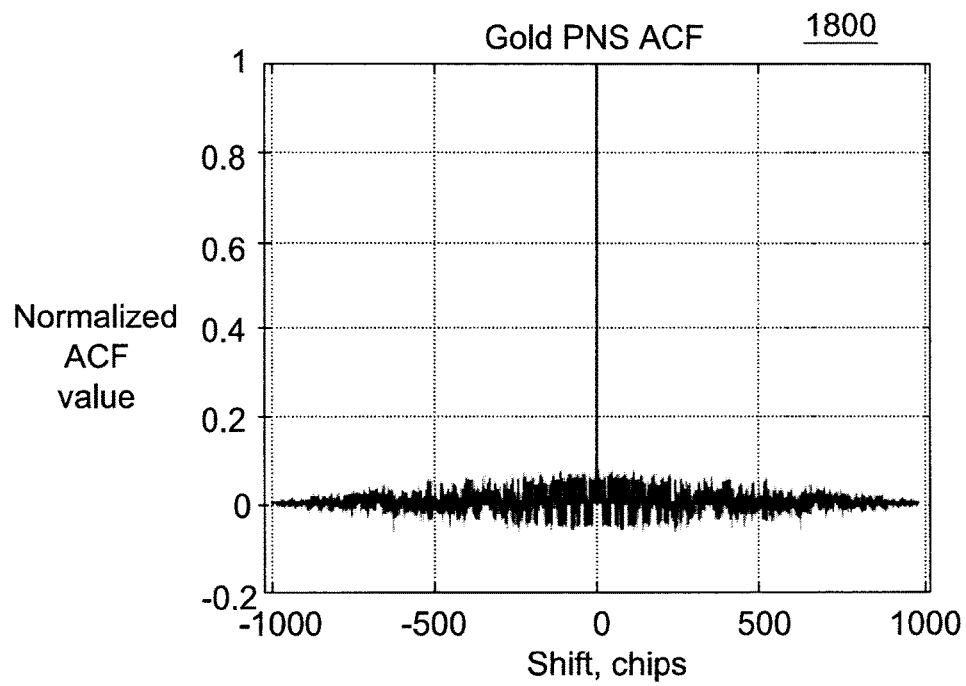
FIG. 18 shows a graph of a normalized auto-correlation function for a Gold code pseudo-random noise (PRS) sequence with a length of 1023 chips in accordance with an embodiment.

FIG. 18 shows a graph 1800 of a normalized auto-correlation function for Gold code pseudo-random noise (PRS) sequence with a length of 1023 chips, typically used in GPS navigation systems, in accordance with an embodiment.

Figure 19:
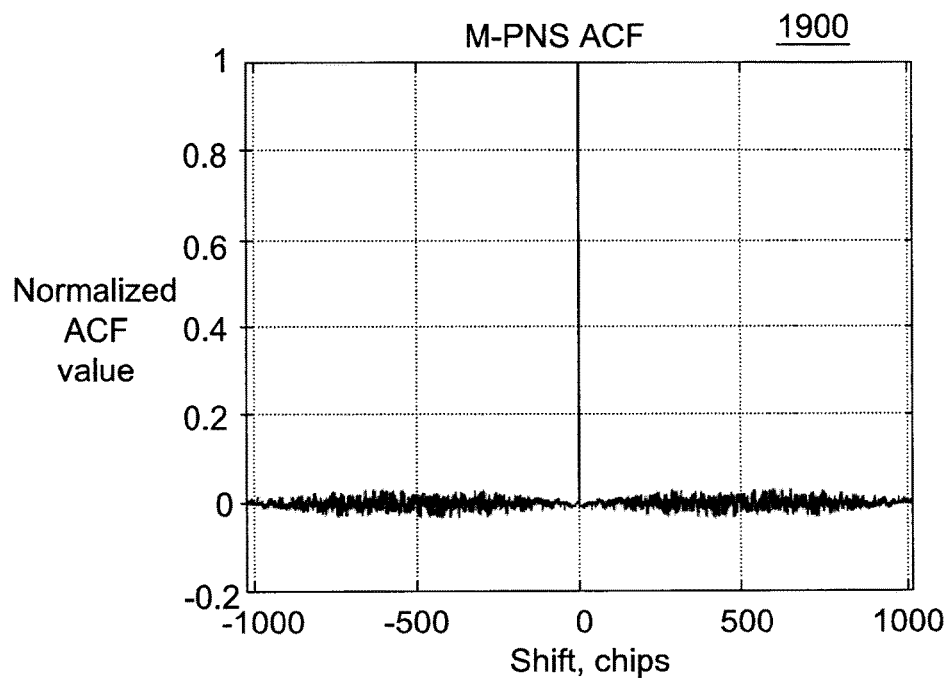
FIG. 19 shows a graph of a normalized auto-correlation function for M-sequence with a length of 1023 chips in accordance with an embodiment.

FIG. 19 shows a graph 1900 of a normalized auto-correlation function for M-sequence with a length of 1023 chips, typically used in GLONASS navigation systems, in accordance with an embodiment.

Figure 20:
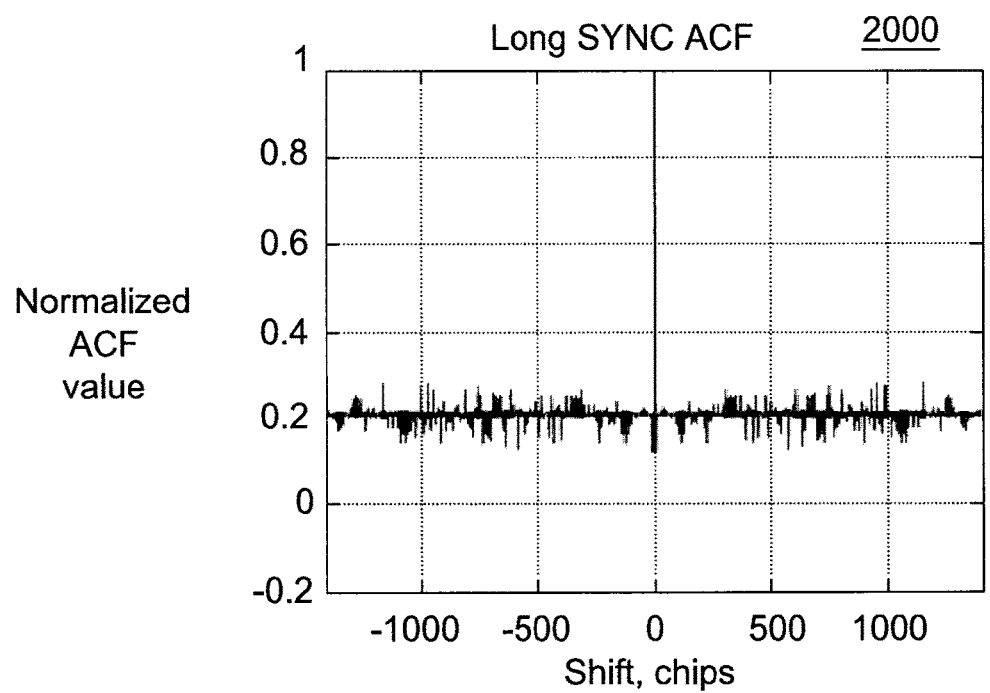
FIG. 20 shows a graph of a normalized auto-correlation function for a long preamble SYNC in accordance with an embodiment.

FIG. 20 shows a graph 2000 of a normalized auto-correlation function for a long preamble SYNC in accordance with an embodiment. As shown, the level of side-lobes for long preamble SYNC is comparable the level of side-lobes for Gold PRS and M-sequence signals thereby allowing for the use of long preamble SYNC signals for a variety of navigation operations.

Figure 21:
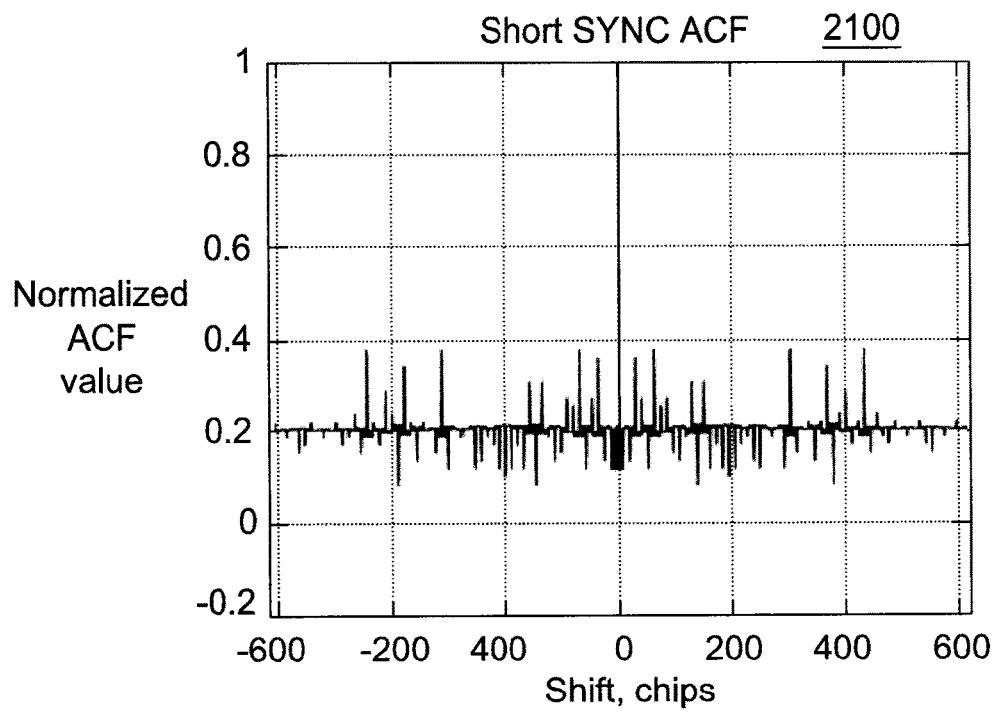
FIG. 21 shows a graph of a normalized auto-correlation function for a short preamble SYNC in accordance with an embodiment.

FIG. 21 shows a graph 2100 of a normalized auto-correlation function for a short preamble SYNC in accordance with an embodiment. As shown, the level of side-lobes for short preamble SYNC signals is higher for the case of long preamble SYNC signals but are comparable to the level of side-lobes for Gold PRS and M-sequence signals thereby allowing for the use of short preamble SYNC signals for navigation operations in which shorter distance navigation is desired.

Figure 22:
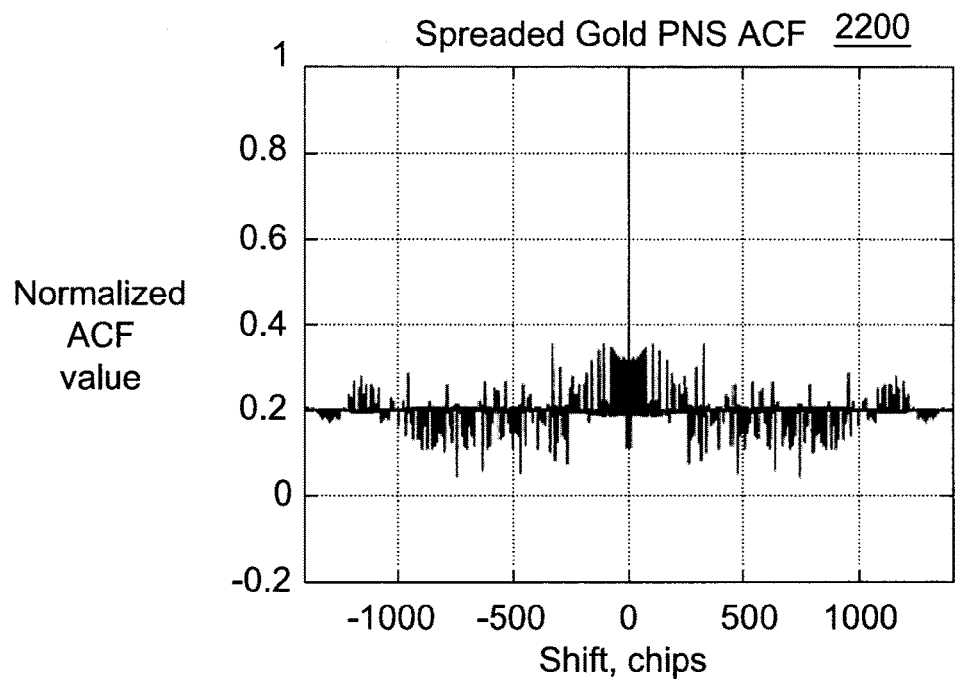
FIG. 22 shows a graph of a normalized auto-correlation function for a Gold code pseudo-random noise (PRS) sequence spread by the Barker codes in accordance with an embodiment.

FIG. 22 shows a graph 2200 of a normalized auto-correlation function for Gold code pseudo-random noise (PRS) sequence spread by the Barker codes in accordance with an embodiment. As shown, the level of side-lobes is comparable to the level of side-lobes for Gold PRS and M-sequence signals thereby allowing for the use of spread Gold PRS signals for a variety of navigation operations, and also allowing for users of the 802.11 protocol to detect 802.11-like signals in the transmission medium through a CCA procedure in accordance with the 802.11 protocol.

Figure 23:
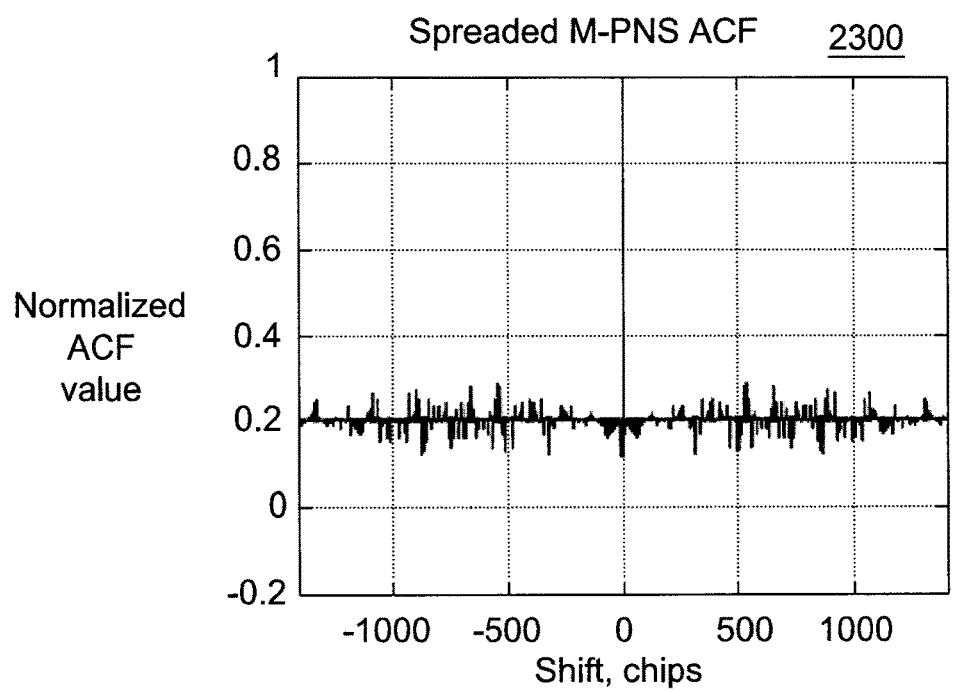
FIG. 23 shows a graph of a normalized auto-correlation function for a M-sequence expanded by the Barker codes.

FIG. 23 shows a graph 2300 of a normalized auto-correlation function for M-sequence signals spread by the Barker codes in accordance with an embodiment. The level of side-lobes is comparable to the level of side-lobes for Gold PRS and M-sequence signals thereby allowing for the use of M-sequence signals for a variety of navigation operations, and also allowing for users of the 802.11 protocol to detect 802.11-like signals in the transmission medium through a CCA procedure in accordance with the 802.11 protocol.

Figure 24A:
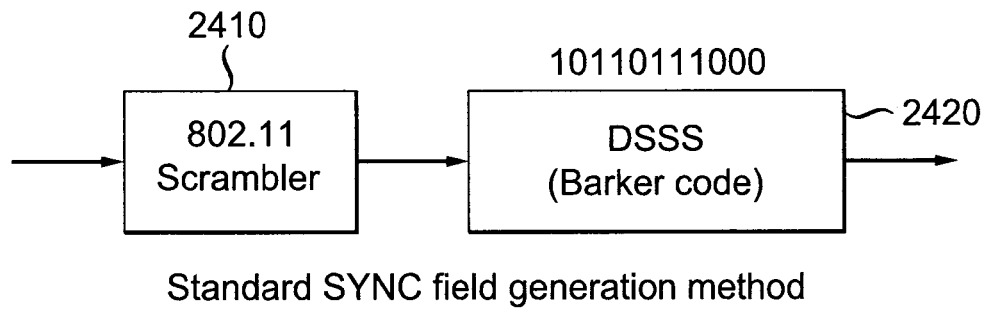
FIGS. 24(a) through (c) show generating the SYNC and PNS fields in navigation signal frames in accordance with various embodiments.
Figure 24B:
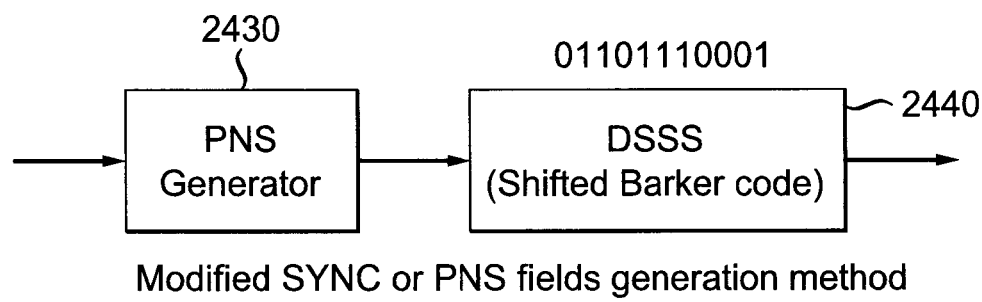
Figure 24C:
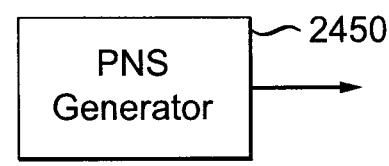

FIGS. 24 (a) through (c) show generating the SYNC and PNS fields in navigation signal frames in accordance with various embodiments. In the of embodiment of FIG. 24(a), the SYNC field of the navigation signal frame is generated when signal bits at rate of 1 MHz are provided to the input of scrambler 2410 configured according to the 802.11 protocol, and then the scrambled signal is expanded by an 11-chip Barker code 2420 resulting in an output chip frequency of 11 MHz. As shown in embodiment of FIG. 24(b), PRS generator 2430 is used at the output rate of 1 MHz, and to decrease mutual correlation of information and navigation components, the bit stream at the generator output is expanded by the 11-chip Barker code 2440 shifted relative to the information channel, thereby resulting in the output chip rate of 11 MHz. As shown in the embodiment of FIG. 24(c), PRS generator 2450 alone is used with an output chip rate of 11 MHz.

Figure 25A:
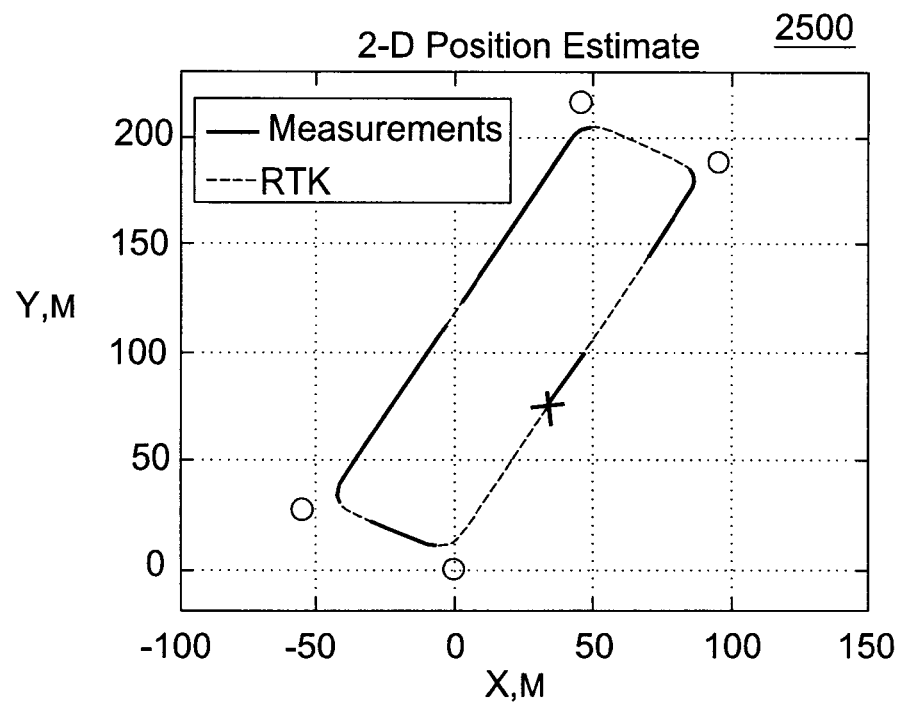
FIGS. 25(a) and (b) show certain experimental results associated with determining a mobile station's position in accordance with the embodiments.
Figure 25B:
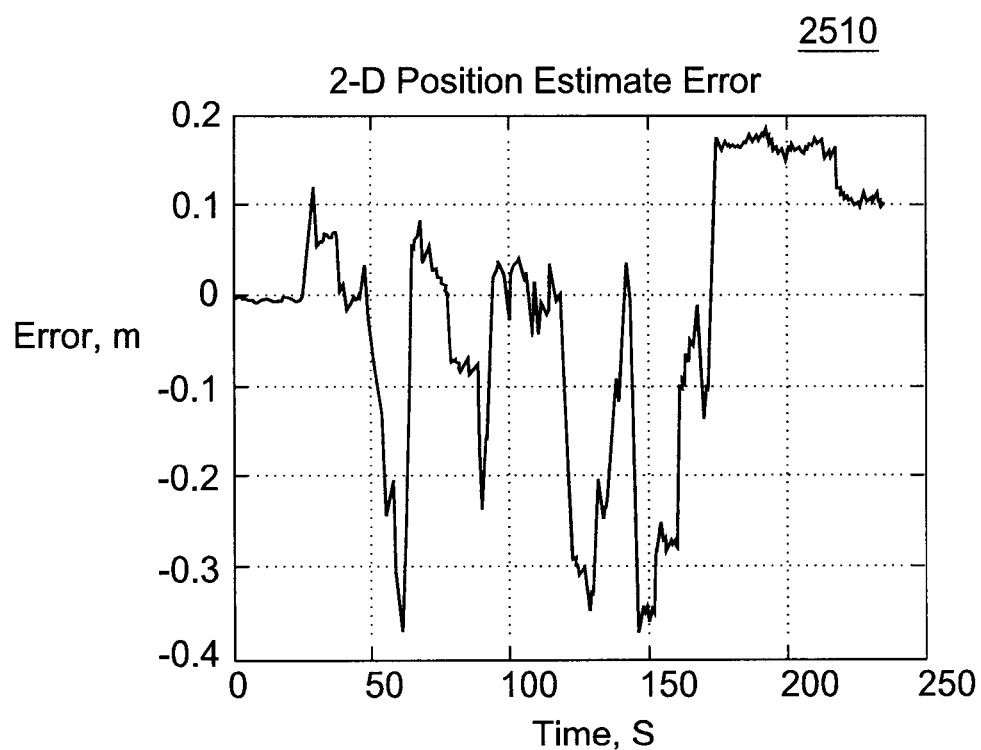

FIGS. 25 (a) and (b) show certain experimental results associated with determining a mobile station's position in accordance with an embodiment. An estimate of the receiver's two-dimensional (2D) trajectory relative to the starting point (designated by symbol «+») with return to the starting point is shown. This evaluation was done by phase measurements of the rover in the embodiments detailed herein above. Reference measurements were obtained by a RTK GNSS receiver at the same time. As shown in FIG. 25(a), graph 2500 depicts the results where circles show positions of base stations for the system in consideration. In FIG. 25(b), graph 2510 depicts the results where 2D position errors are presented based on phase measurements. RTK-obtained positions served as a true trajectory. As will be readily ascertained from FIGS. 25(a) and 25(b), the experimental results confirm the operability and efficiency of the herein described embodiments of signal generating and processing as per the prototype configured for such purposes. In particular, a receiver's relative position accuracy based on phase measurements is proved to achieve centimeter-level accuracy when an extra transmitter is added to the local positioning system.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining a position of a mobile station comprising:
   exchanging a plurality of Wi-Fi signals between the mobile station and a plurality of base stations, the plurality of base stations comprising a master base station in communication with a set of slave base stations, the master base station and the set of slave base stations being spatially located in a predefined manner;
   exchanging a plurality of communication signals between the mobile station, the master base station and the set of slave base stations, particular ones of the plurality of communication signals configured as a plurality of frames having a predetermined time sequence, particular frames of the plurality of frames having a specified symbol sequence for positioning the mobile station, and at least one frame of the particular frames having a set of service information specific to the positioning of the mobile station;
   measuring a first set of delay and phase differences associated with particular ones of the plurality of Wi-Fi signals and particular ones of the plurality of communication signals exchanged between the mobile station and a first pair of the plurality of base stations;
   measuring a second set of delay and phase differences associated with particular other ones of the plurality of Wi-Fi signals and particular other ones of the plurality of communication signals exchanged between the mobile station and a second pair of the plurality of base stations, the first pair of the plurality of base stations and the second pair of the plurality of base stations being different; and
   calculating the position of the mobile station using the first set of delay and phase differences and the second set of delay and phase differences.

2. The method of claim 1 wherein the plurality of Wi-Fi signals are compliant with an 802.11 protocol, the mobile station is a rover, and the master base station and the set of slave base stations each have known coordinates.

3. The method of claim 1 further comprising:
synchronizing the master base station and the set of slave base stations.

4. The method of claim 3 wherein the synchronizing includes a time and frequency synchronization using a communications link.

5. The method of claim 4 wherein the communications link is associated with a cable communications network.

6. The method of claim 3 wherein the synchronizing further comprises:
transmitting a plurality of navigation signals from the master base station, at least one navigation signal employed as a synchronization signal for use in the synchronizing of the master base station and the set of slave base stations.

7. The method of claim 1 wherein the specified symbol sequence comprises a preamble fragment with a scrambled set of units expanded by a Barker code.

8. The method of claim 7 wherein at least one frame of the plurality of frames includes a pseudo-random noise (PRS) sequence.

9. The method of claim 2 further comprising:
assigning, by the master base station, a contention-free period (CFP), the CFP defining a period when signal transmission from the set of slave base stations and the rover is enabled solely by the master base station.

10. The method of claim 9 wherein the period defined by the CFP comprises a navigation part and a communication part, such that during the navigation part of the period the master base station and the set of slave base stations sequentially transmit a plurality of navigation frames at predetermined intervals, and during the communication part of the period the master base station receives data from the rover.

11. The method of claim 10 further comprising:
transmitting, from the rover, the data.

12. The method of claim 11 further comprising:
transmitting, by the master base station, at least one of the plurality of navigation frames.

13. The method of claim 1 wherein the master base station is operating in accordance with an 802.11 protocol, the method further comprising:
generating, by the master base station, a QPSK-modulated signal for at least one frame of the plurality of frames, the QPSK-modulated signal having a first quadrature component used for transmitting information in a standard mode; and a second quadrature component used for transmitting a navigation signal in the form of a pseudo-random sequence (PRS).

14. The method of claim 13 wherein the navigation signal is one of the plurality of communication signals and the PRS is shifted using a Barker code.

15. The method claim 1 further comprising:
applying a «RTS/CTS-handshake» for a time-division multiplexing of the plurality of communication signals exchanged between the master base station and the set of slave base stations;
transmitting, from the master base station and at an allocated time interval, a broadband message such that a transmission of a particular one frame of the plurality of frames immediately follows the transmitting of the broadband message; and
establishing a plurality of time intervals at which time the set of slave base stations are to transmit particular ones of the plurality of communication signals, and at each time interval initiating the «RTS/CTS-handshake» between the master base station and the set of slave base stations transmitting a particular one of the frames within the time interval.

16. The method of claim 15 further comprising:
initiating a data transmission from the mobile station within the time interval.

17. A master base station for use in determining a position of a mobile station comprising:
at least one information port for exchanging a plurality of Wi-Fi signals with the mobile station, a user station, and a set of slave base stations, the master base station and the set of slave base stations being spatially located in a predefined manner;
at least one navigation port for exchanging a plurality of communication signals with the mobile station and the set of slave base stations, particular ones of the plurality of communication signals configured as a plurality of frames having a predetermined time sequence, particular frames of the plurality of frames having a specified symbol sequence for positioning the mobile station, and at least one frame of the particular frames having a set of service information specific to the positioning of the mobile station; and
wherein the position of the mobile station is determined by:
measuring a first set of delay and phase differences associated with particular ones of the plurality of Wi-Fi signals and particular ones of the plurality of communication signals exchanged between the mobile station and a first pair of base stations comprising the master base station and particular ones of the set of slave base stations;
measuring a second set of delay and phase differences associated with particular other ones of the plurality of Wi-Fi signals and particular other ones of the plurality of communication signals exchanged between the mobile station and a second pair of base stations comprising the master base station and particular other ones of the set of slave base stations; and
calculating the position of the mobile station using the first set of delay and phase differences and the second set of delay and phase differences.

18. The master base station of claim 17, further comprising:
at least one synchronization port for exchanging a plurality of synchronization signals with the set of slave base stations; and
wherein the master base station has a sequentially connected block architecture, the sequentially connected block architecture comprising:
a modified MAC layer generation block;
a physical layer (PHY) generation block;
a transceiver;
a navigation signal generator; and
wherein (i) a data exchange port of the modified MAC layer generation block is connected to a corresponding port of the navigation signal generator and a corresponding port of the PHY generation block, (ii) an output port of the navigation signal generator is connected to a corresponding input port of the transceiver, and (iii) an output port of the PHY generation block is connected to a corresponding input port of the transceiver such that the transceiver combines an output of the navigation signal generator with a particular one synchronization signal of the plurality of synchronization signals.

19. The master base station of claim 17 wherein master base station is further configured such that the position of the mobile station is determined by measuring a third set of delay and phase differences associated with particular ones of the plurality of Wi-Fi signals exchanged between the user station and the master base station, and the calculating the position of the mobile station uses the first set of delay and phase differences, the second set of delay and phase differences, and the third set of delay and phase differences.

20. The master base station of claim 17 wherein the plurality of Wi-Fi signals are compliant with an 802.11 protocol, the mobile station is a rover, and the master base station and the set of slave base stations each having known coordinates.

21. The master base station of claim 17 wherein the specified symbol sequence comprises a preamble fragment with a scrambled set of units expanded by a Barker code, and at least one frame of the plurality of frames includes a pseudo-random noise (PRS) sequence.

22. The master base station of claim 20 wherein master base station is further configured to assign a contention-free period (CFP), the CFP defining a period when signal transmission from the set of slave base stations and the rover is enabled solely by the master base station.

23. The master base station of claim 22 wherein the period defined by the CFP comprises a navigation part and a communication part, such that during the navigation part of the period the master base station and the set of slave stations sequentially transmit a plurality of navigation frames at predetermined intervals, and during the communication part of the period the master base station receives data from the rover.

24. The master base station of claim 17 wherein the master base station is further configured to operate in accordance with an 802.11 protocol, and generates a QPSK-modulated signal for at least one frame of the plurality of frames, the QPSK-modulated signal have a first quadrature component used for transmitting information in a standard mode; and a second quadrature component used for transmitting a navigation signal in the form of a pseudo-random sequence (PRS).

25. A system for determining a position of a mobile station comprising:
a master base station;
a set of slave base stations, the master base station and the set of slave base stations being spatially located in a predefined manner, and the master base station and the set of slave base stations each having known coordinates;
a user station;
at least one communications medium between the mobile station, the master base station, the set of slave base stations, and the user station for exchanging (i) a plurality of Wi-Fi signals between the mobile station, the master base station, the set of slave base stations, and the user station, and (ii) a plurality of communication signals between the mobile station, the master base station and the set of slave base stations, particular ones of the plurality of communication signals configured as a plurality of frames having a predetermined time sequence, particular frames of the plurality of frames having a specified symbol sequence for positioning the mobile station, and at least one frame of the particular frames having a set of service information specific to the positioning of the mobile station;
wherein the position of the mobile station is determined by:

measuring a first set of delay and phase differences associated with particular ones of the plurality of Wi-Fi signals and particular ones of the plurality of communication signals exchanged between the mobile station and a first pair of base stations comprising the master base station and particular ones of the set of slave base stations;
measuring a second set of delay and phase differences associated with particular other ones of the plurality of Wi-Fi signals and particular other ones of the plurality of communication signals exchanged between the mobile station and a second pair of base stations comprising the master base station and particular other ones of the set of slave base stations; and
calculating the position of the mobile station using the first set of delay and phase differences and the second set of delay and phase differences.

26. The system of claim 25 wherein the plurality of Wi-Fi signals are compliant with an 802.11 protocol, the mobile station is a rover, and the master base station and the set of slave base stations each having known coordinates.

27. The system of claim 25 wherein the master base station comprises: at least one information port for the exchanging of the plurality of Wi-Fi signals with the mobile station, the user station, and the set of slave base stations; at least one navigation port for the exchanging the plurality of communication signals with the mobile station and the set of slave base stations; and at least one synchronization port for exchanging a plurality of synchronization signals with the set of slave base stations.

28. The system of claim 27 wherein the master base station has a sequentially connected block architecture, the sequentially connected block architecture comprising:
a modified MAC layer generation block;
a physical layer (PHY) generation block;
a transceiver;
a navigation signal generator; and
wherein (i) a data exchange port of the modified MAC layer generation block is connected to a corresponding port of the navigation signal generator and a corresponding port of the PHY generation block, (ii) an output port of the navigation signal generator is connected to a corresponding input port of the transceiver, and (iii) an output port of the PHY generation block is connected to a corresponding input port of the transceiver such that the transceiver combines an output of the navigation signal generator with a particular one synchronization signal of the plurality of synchronization signals.

29. The system of claim 28 wherein the system is further configured such that the position of the mobile station is determined by measuring a third set of delay and phase differences associated with particular ones of the plurality of Wi-Fi signals exchanged between the user station and the master base station, and the calculating the position of the mobile station uses the first set of delay and phase differences, the second set of delay and phase differences, and the third set of delay and phase differences.

30. The system of claim 25 wherein the master base station is further configured to operate in accordance with an 802.11 protocol, and generates a QPSK-modulated signal for at least one frame of the plurality of frames, the QPSK-modulated signal have a first quadrature component used for transmitting information in a standard mode; and a second quadrature component used for transmitting a navigation signal in the form of a pseudo-random sequence (PRS).

* * * * *